US012006643B2

(12) United States Patent
Sanders

(10) Patent No.: US 12,006,643 B2
(45) Date of Patent: Jun. 11, 2024

(54) SOUND DAMPENING BARRIER WALL

(71) Applicant: Mute Wall Systems, Inc., Peoria, AZ (US)

(72) Inventor: Keith A. Sanders, Litchfield Park, AZ (US)

(73) Assignee: Mute Wall Systems, Inc., Peoria, AZ (US)

( * ) Notice: Subject to any disclaimer, the term of this patent is extended or adjusted under 35 U.S.C. 154(b) by 479 days.

(21) Appl. No.: 17/330,615

(22) Filed: May 26, 2021

(65) Prior Publication Data

US 2021/0372060 A1 Dec. 2, 2021

Related U.S. Application Data

(60) Provisional application No. 63/030,844, filed on May 27, 2020.

(51) Int. Cl.
*E01F 8/00* (2006.01)
*G10K 11/16* (2006.01)

(52) U.S. Cl.
CPC .......... *E01F 8/0011* (2013.01); *E01F 8/0023* (2013.01); *E01F 8/0029* (2013.01); *G10K 11/16* (2013.01)

(58) Field of Classification Search
CPC ......... E01F 8/00; E01F 8/0005; E01F 8/0011; E01F 8/0017; E04B 2001/8423; E04B 2001/8428; E04B 2001/8433; E04B 2001/8438; E04B 2001/8476; E04B 2001/848; E04B 2001/8485; E04B 2001/849
USPC .................................................. 181/210, 293
See application file for complete search history.

(56) References Cited

U.S. PATENT DOCUMENTS 2,007,130 A * 7/1935 Munroe .................... E04B 1/86 52/145
3,275,101 A 9/1966 Morrissey et al.
3,783,968 A * 1/1974 Derry .................... E01F 8/0052 D25/160
4,566,558 A 1/1986 Link, Jr. et al.
(Continued)

FOREIGN PATENT DOCUMENTS

CN 108729368 A * 11/2018 ............ E01F 8/0005
DE 2744382 A1 * 4/1979
(Continued)

OTHER PUBLICATIONS

English translation for DE 19628090 C, accessed Oct. 26, 2023 via USPTO Search tool (Year: 2001).*
(Continued)

*Primary Examiner* — Jeremy A Luks
(74) *Attorney, Agent, or Firm* — Brian M. Kaufman; Robert D. Atkins; PATENT LAW GROUP: Atkins and Associates, P.C.

(57) ABSTRACT

A wall panel has a block of base material, e.g., expanded polystyrene. A resonator tube is disposed in the block. A sound dampening material is disposed in the resonator tube. The sound dampening material can be recycled mattress or carpet. An inlet pipe extends into the resonator tube. A vent is disposed over the inlet pipe. A barrier wall can be formed by stacking multiple wall panels. Additional resonator tubes can be disposed between the wall panels.

20 Claims, 25 Drawing Sheets

(56) References Cited

U.S. PATENT DOCUMENTS

| | | | | | |
|---|---|---|---|---|---|
| 4,600,078 | A * | 7/1986 | Wirt | G10K 11/172 181/290 |
| 5,004,070 | A | 4/1991 | Wang | |
| 5,457,291 | A * | 10/1995 | Richardson | G10K 11/172 181/294 |
| 5,512,715 | A * | 4/1996 | Takewa | G10K 11/168 181/290 |
| 5,730,548 | A * | 3/1998 | Brero | E01C 3/006 404/71 |
| 5,959,265 | A | 9/1999 | Van Ligten | |
| 6,164,035 | A * | 12/2000 | Roberts | E04B 1/14 52/745.1 |
| 6,435,303 | B1 * | 8/2002 | Warnaka | E04B 1/86 181/286 |
| 8,136,630 | B2 * | 3/2012 | Schnitta | E04B 1/8209 181/295 |
| 9,697,817 | B2 * | 7/2017 | Zalewski | G10K 11/172 |
| 10,400,402 | B1 | 9/2019 | Sanders et al. | |
| 2007/0034447 | A1 | 2/2007 | Proscia et al. | |
| 2011/0278091 | A1 * | 11/2011 | Honji | G10K 11/172 181/290 |
| 2012/0247867 | A1 * | 10/2012 | Yang | E04B 1/86 181/211 |
| 2016/0071507 | A1 * | 3/2016 | Kim | E04B 1/84 181/286 |
| 2019/0284773 | A1 | 9/2019 | Sanders et al. | |

FOREIGN PATENT DOCUMENTS

| | | | | |
|---|---|---|---|---|
| DE | 19628090 | C2 * | 11/2001 | E01F 8/007 |
| EP | 0518304 | | 12/1992 | |
| EP | 0965122 | B1 * | 11/2002 | |
| EP | 1431472 | A1 * | 6/2004 | E04B 1/86 |
| EP | 3093391 | A1 * | 11/2016 | E01F 8/0017 |
| EP | 2491180 | B1 * | 10/2017 | E01C 1/002 |
| JP | 2001003482 | A * | 1/2001 | |
| JP | 5662404 | | 12/2014 | |
| KR | 20050067809 | A * | 7/2005 | |
| KR | 100729345 | B1 * | 6/2007 | |
| KR | 976058 | B1 * | 8/2010 | |
| KR | 100988979 | B1 * | 10/2010 | |
| KR | 101006085 | B1 * | 1/2011 | |
| KR | 200470250 | Y1 * | 12/2013 | |
| KR | 101679363 | B1 * | 11/2016 | |

OTHER PUBLICATIONS

English translation for KR 20050067809 A, accessed Oct. 26, 2023 via USPTO Search tool (Year: 2005).*

The Ultimate Guide to Acoustic Treatment for Home Studios, https://ehomerecordingstudio.com/acoustic-treatment-101/, downloaded Apr. 16, 2021.

Harjana et al., Sound Insulation and Absorption Properties of Re-claimed Waste Tire Rubber, Conference Paper, Sep. 2014.

Laroche produces recycled nonwovens at technical centre, Mar. 22, 2019.

Mattress Sponge as sound insulation and absorption, https://www.hometheatershack.com/threads/mattress-sponge-as-sound-insulation-and-absorption.6757/, downloaded Apr. 16, 2021.

Mattresses as sound absorption?, https://gearspace.com/board/low-end-theory/472626-mattresses-sound-absorption.html, downloaded Apr. 16, 2021.

Peacemaker Sound Barrier—3.2mm, https://www.audimute.com/peacemaker-sound-barrier, downloaded Apr. 16, 2021.

Thornton, Denise, Sound insulation made out of old blue jeans, Oct. 23, 2012.

PU Recycled Foam/Rebond Foam/Mattress Foam Sheet, https://www.alibaba.com/product-detail/PU-Recycled-Foam-Rebond-Foam-Mattress_50032652359.html, downloaded Apr. 16, 2021.

* cited by examiner

SOUND DAMPENING BARRIER WALL

CLAIM TO DOMESTIC PRIORITY

The present application claims the benefit of U.S. Provisional Application No. 63/030,844, filed May 27, 2020, which application is incorporated herein by reference.

FIELD OF THE INVENTION

The present invention relates in general to barrier wall construction and, more particularly, to improved wall panels, barrier walls constructed from the wall panels, and methods of forming the wall panels and the barrier wall from the wall panels to increase sound dampening.

BACKGROUND OF THE INVENTION

Barrier walls are commonly formed for a wide variety of reasons. For instance, barrier walls are commonly formed along highways and other major roads to reduce road noise that nearby residences experience, which might otherwise be disruptive to everyday life.

One method of forming barrier walls uses foam blocks. FIG. 1*a* illustrates a wall panel 10 that is used to build a barrier wall. Wall panel 10 is a block formed from expanded polystyrene (EPS) or another appropriate foam material. Wall panel 10 is a solid block, and includes foam extending to six externally oriented faces. The faces are oriented substantially perpendicular and parallel to each other to form a block shape. Wall panel 10 includes a length dimension L, a width dimension W, and a height dimension H, as labelled in FIG. 1*a*. Top and bottom surfaces 12 of wall panel 10 extend along primarily the length and width dimensions. Wall panel 10 includes two side surfaces 14 that extend along primarily the height and length dimensions, and two end surfaces 16 that extend along primarily the height and width dimensions.

One method of forming a barrier wall 18 from wall panels 10 is illustrated in FIG. 1*b*. Wall panels 10 are stacked between two adjacent vertical I-beam supports 20. The vertical supports 20 are I-beams that include a center web 22 connecting two opposing flanges 24. The combination of web 22 and flanges 24 looks similar to a capital letter 'I' when support 20 is viewed from an end, thus the support is commonly referred to as an I-beam. Supports 20 include baseplates 26 welded or otherwise attached at lower ends of the supports. Supports 20 are attached to concrete footings 30, which are embedded in the ground, through baseplates 26 and bolts 32.

Once supports 20 are securely attached to the ground through footings 30 and baseplates 26, the supports extend vertically from the ground. Adjacent supports 20 are oriented with flanges 24 approximately in parallel to each other so that wall panels 10 can be inserted between the flanges of both support 20*a* and support 20*b* simultaneously. A curved wall can be formed by having the I-beams slightly angled, or a special I-beam can be formed with angles in the flanges to create a corner. A section of barrier wall 18 is completed by stacking any desired number of wall panels 10 between two adjacent supports 20. Any number of wall sections can be formed by using additional supports 20 and disposing additional wall panels 10 between each two adjacent supports.

FIG. 1*b* illustrates two wall sections, one section is being formed between supports 20*a* and 20*b*, with panel 10*a* disposed on the ground and panel 10*b* being stacked over panel 10*a*. Additional panels 10 are stacked to attain the desired barrier wall height. A second wall section has already been formed on the other side of support 20*b* using panels 10*c*, 10*d*, 10*e*, and 10*f*. Another support 20 extends from the ground off the page of FIG. 1*b*, at the opposite end of wall panels 10*c*-10*f*. Barrier wall 18 can be made longer by placing additional supports 20 on either end of the wall and stacking additional wall panels 10 between the open flanges of pillars 20.

Forming barrier wall 18 from foam block wall panels 10 has many advantages over other known types of barrier walls. Wall panels 10 are light and relatively easy to construct a barrier wall from. Wall panel 10 can be fully formed away from the job site, and simply brought in and stacked between supports 20 once formed. However, foam block wall panels 10 do not offer sufficient sound dampening capabilities to meet modern standards. Therefore, a need exists for improved foam block wall panels that improve sound dampening.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
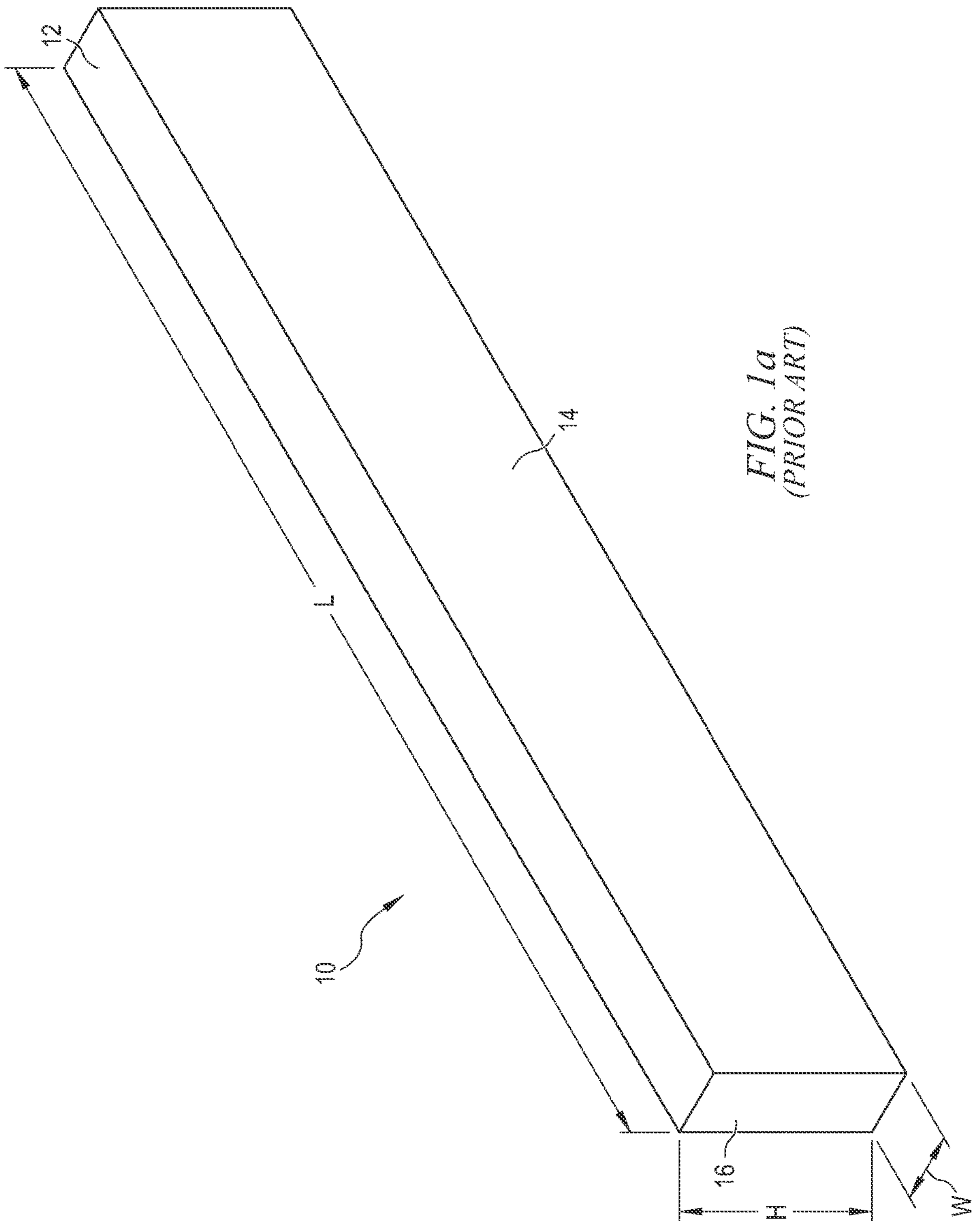
FIG. 1a (PRIOR ART)
FIGS 1*a* and 1*b* illustrate a prior art wall panel and barrier wall.
Figure 1B:
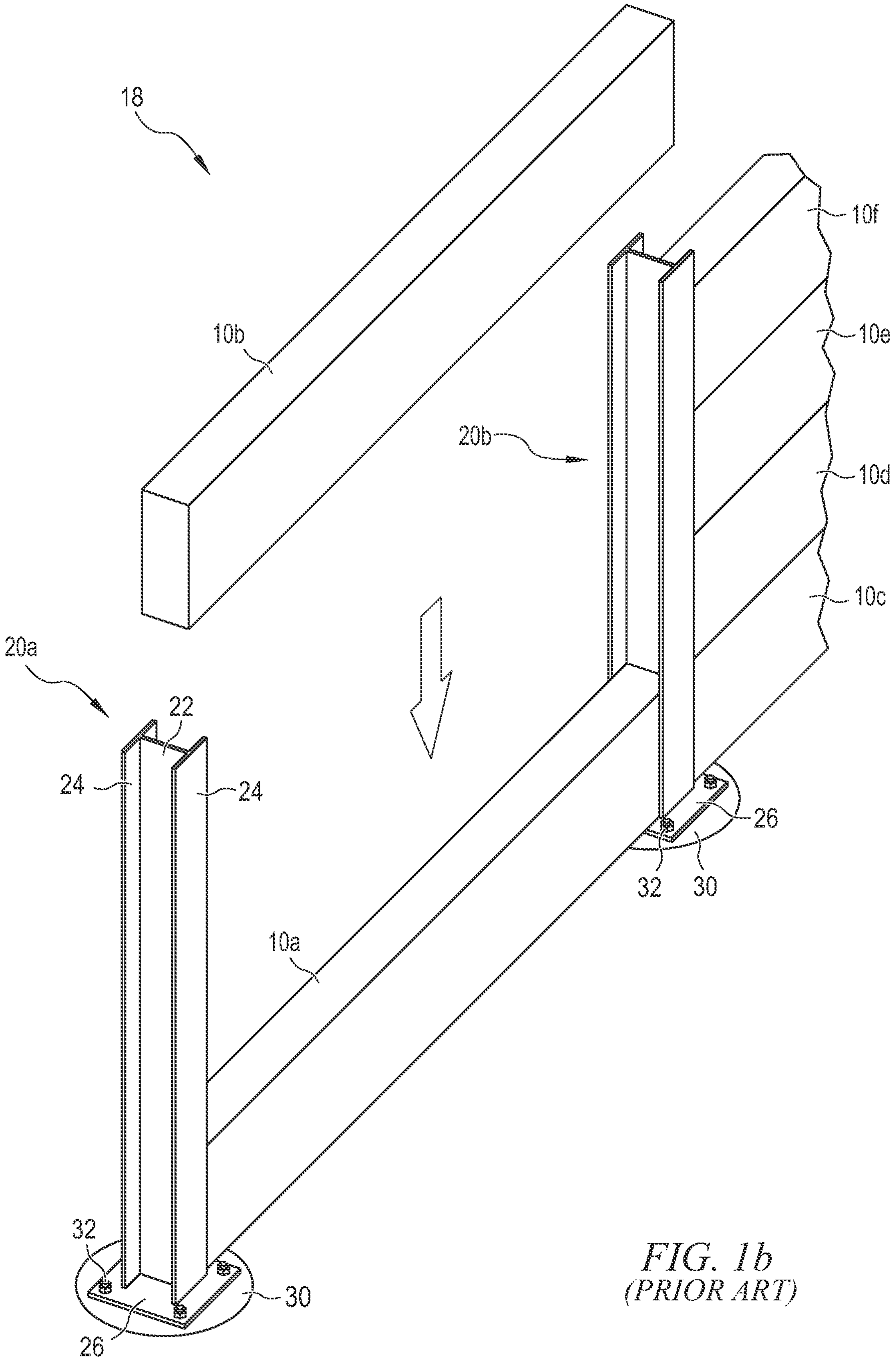
FIG. 1b (PRIOR ART)
Figure 2A:
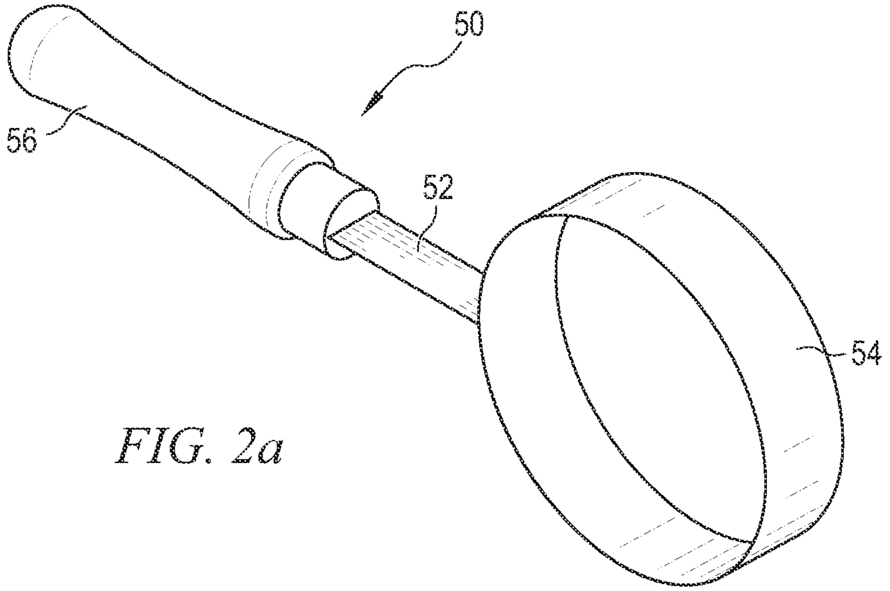
FIGS. 2*a*-2*e* illustrate forming a wall panel with recycled material embedded in the panel as a sound absorbing material.

FIGS. 2*a*-2*e* illustrate forming a wall panel with recycled material embedded into the wall panel as a sound absorbing material, and forming a wall using the panels. FIG. 2*a* illustrates an example of a blade 50 that is used to form channels in a foam wall panel, e.g., wall panel 10, for insertion of recycled sound absorbing material. Blade 50 includes a neck 52, head 54, and handle or shank 56. Head 54 is circular to form cylindrical channels in a foam wall panel. Neck 52 and head 54 are sharpened or heated to cut through the foam panel in the shape of blade 50. Head 54 is circuitous so that the portion of the foam panel that gets pulled through the circular opening can be removed. In some embodiments, a heated wire in the shape of blade 50 is used.

Grooves 78 are formed along top and bottom surfaces 12 to accommodate an I-beam that is inserted between stacked blocks 70.

Figure 2B:
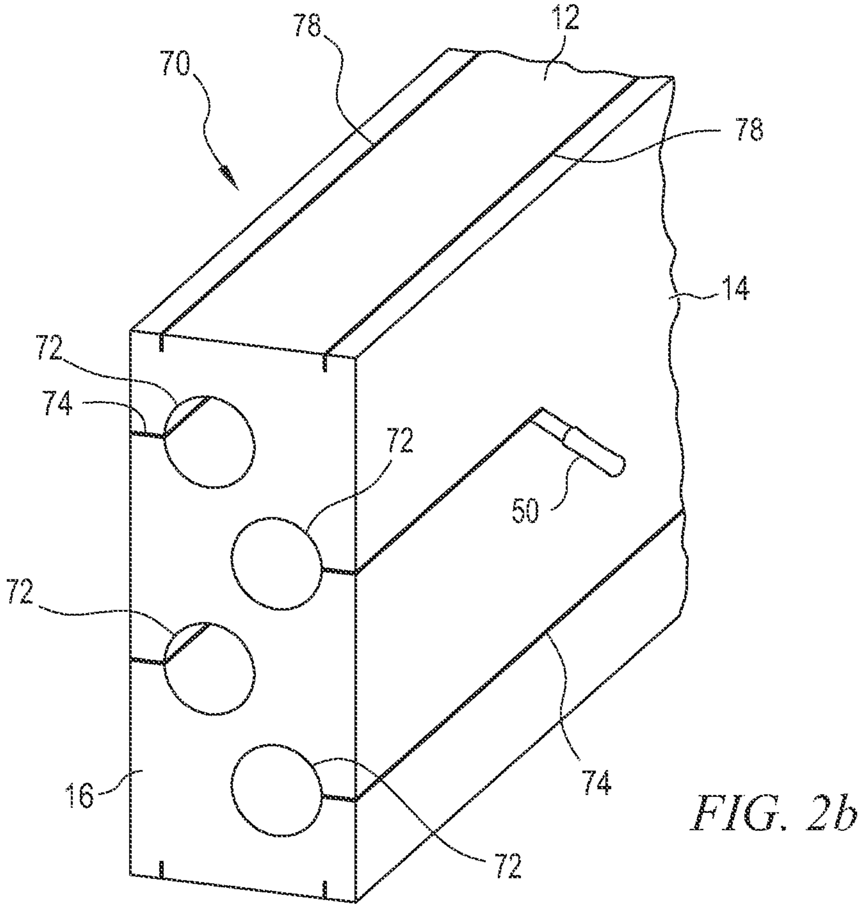

FIG. 2*b* illustrates wall panel 70 with channels 72 cut into the wall panel. Wall panel 70 begins as a foam wall panel similar to panel 10, and includes channels 72 formed using blade 50. EPS is used as the base material for wall panel 70, but any other suitable material is used as the base material in other embodiments. For other materials, more efficient methods of forming channels 72 than using blade 50 may exist, e.g., drilling. FIG. 2*b* illustrates the top-right channel 72 in the process of being formed by blade 50. In one embodiment, wall panel 70 includes a height of two feet, a width of ten inches, a length of fourteen feet eleven inches, and an EPS density of 1.5 pounds per cubic foot. Wall panel 70 can be cut to any desired dimensions and the size, shape, and number of channels 72 can be modified to accommodate the different size of wall panel. Other densities of EPS can be used as desired. Any other suitable material can be used in other embodiments.

Blade 50 can be dragged through a side surface 14 from one end surface 16 to the other by hand to cut channels 72. In another embodiment, multiple blades 50 can be attached to a surface, and then the panel 70 is moved over the surface to cut multiple channels at once. A frame with a height and width approximately matching panel 70 is used in some embodiments to hold multiple blades and cut every channel 72 in a single motion. Blade 50 also cuts a slot 74 along the length of wall panel 70 as a byproduct of blade 50 including neck 52. Channels 72 can be formed using any other suitable process, such as by drilling through wall panel 70 using a hole saw or by using a laser to cut out the channels.

In the illustrated embodiment, four channels 72 are formed with a diameter of four inches each. The channels 72 are offset laterally so that every other channel is closer to one of the side surfaces 14 or the other. Having a lateral offset between each adjacent channel 72 allows the channels to be closer together vertically by moving the channels further away from each other horizontally. In some embodiments, channels 72 are formed with a large enough lateral offset that the channels can overlap each other vertically. A vertical overlap between adjacent channels 72 means that sound waves hitting wall panel 70 are less likely to travel between the channels without hitting a channel.

Figure 2C:
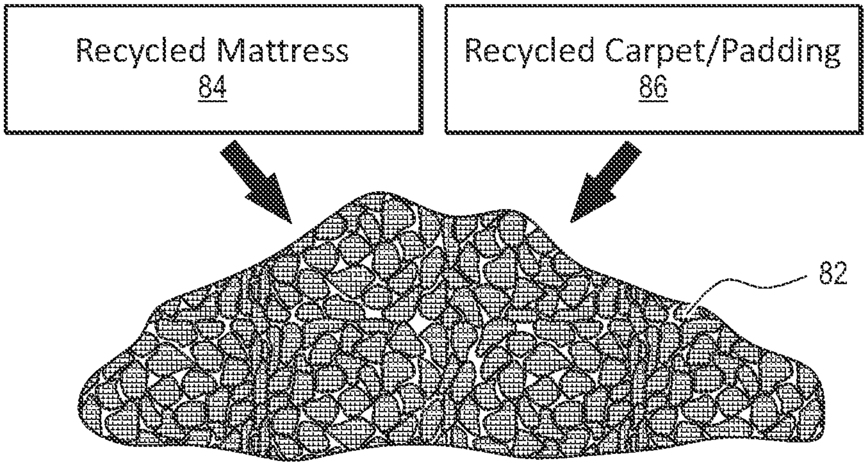

FIG. 2*c* shows preparation of recycled material 82 to be stuffed into channels 72. To form recycled material 82, any suitable source material is ground, shredded, or chopped up into a loose mixture. The most common effective material comes from grinding up used mattresses 84 and carpet 86. Utilizing previously used items to make recycled material 82 results in mattresses and carpets being repurposed instead of thrown in landfills. However, the source material does not need to be previously used, repurposed, or recycled material. New material manufactured specifically to be sound dampening is used in other embodiments. The material can be paper, wood, plastic, glass, ground up tires, or any other suitable materials.

Figure 2D:
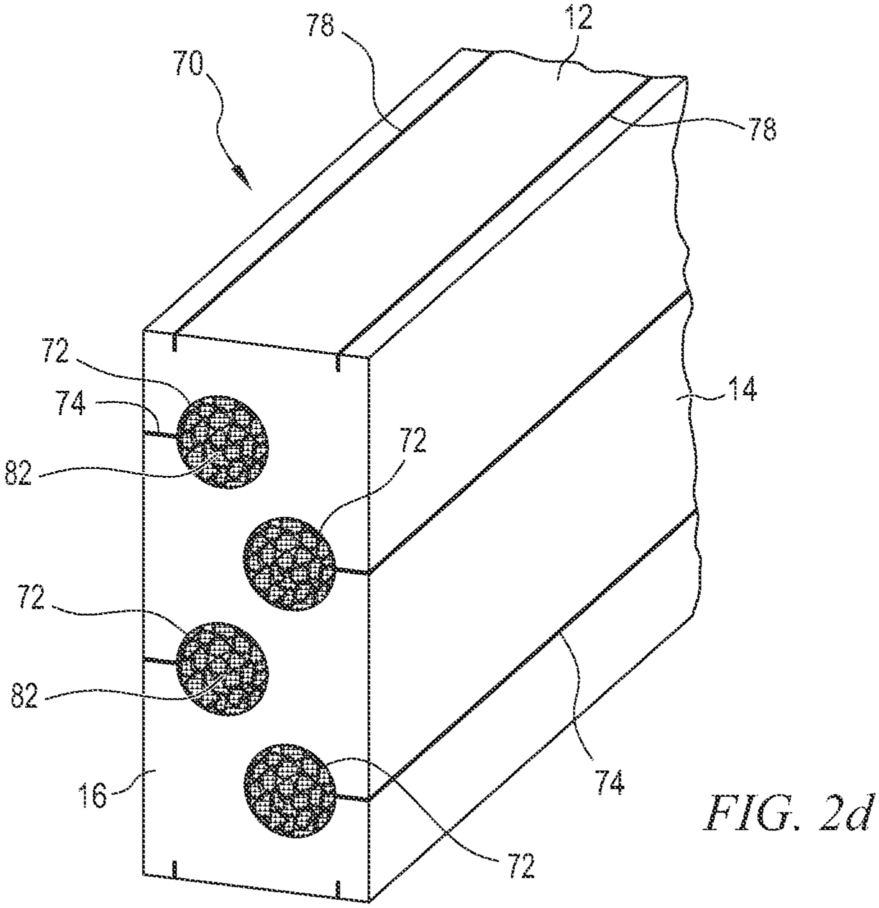
Figure 2E:
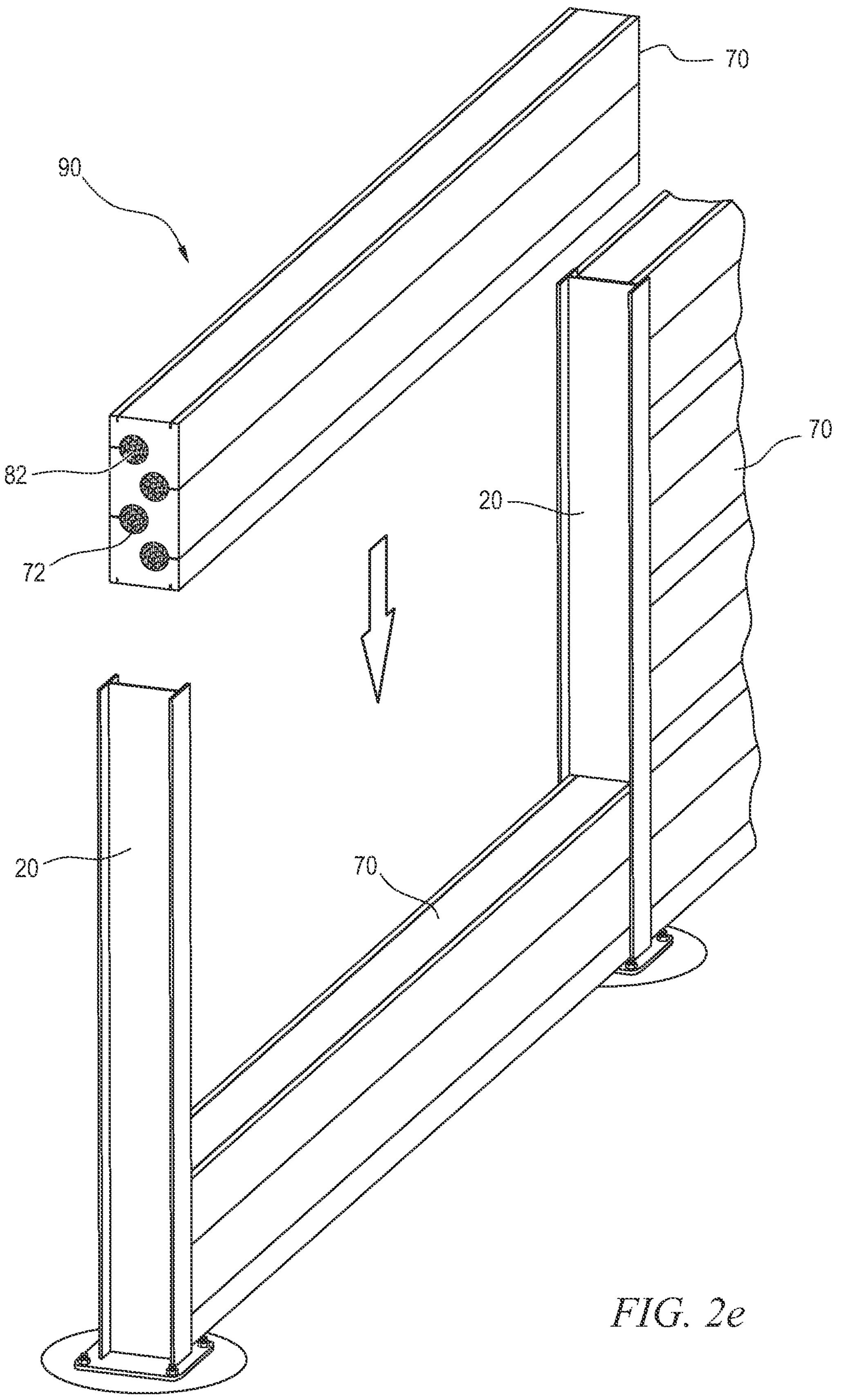

In FIG. 2*d*, channels 72 of wall panel 70 are filled with recycled material 82. Channels 72 can be filled by hand, using a scoop and funnel, blown in, or by any other suitable means. Recycled material 82 can be compressed down in channels 72 to increase the density using a rod, plunger, or other suitable tool. Once all channels 72 are stuffed with recycled material 82, wall panel 70 is complete and a wall can be built. FIG. 2*e* shows building a barrier wall 90 using a stack of wall panels 70 between vertical supports 20. Wall panels 70 can be stacked to any desired height. Barrier wall 90 operates similarly to barrier wall 18 but adds recycled material 82 to increase sound dampening capability.

Figure 3A:
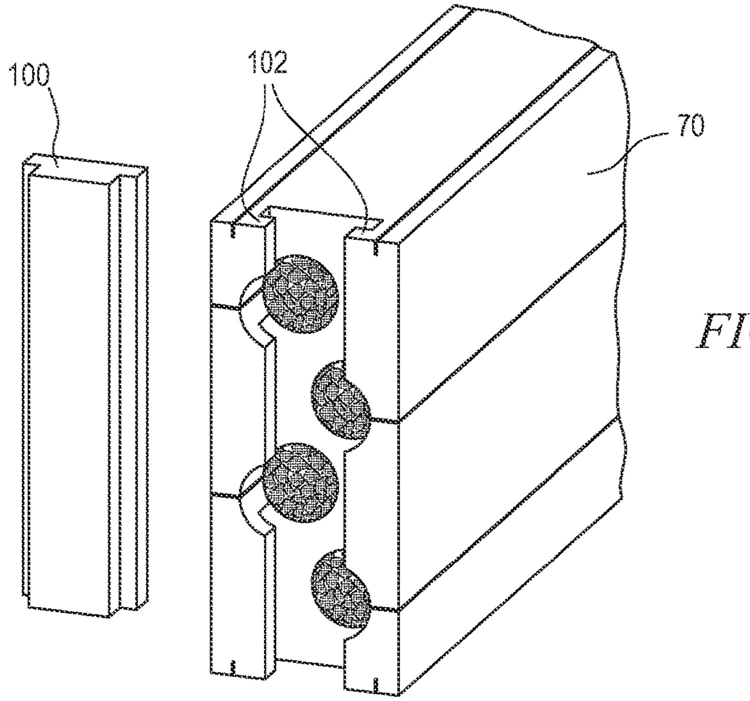
FIGS. 3*a* and 3*b* illustrate a cutout at the end of the wall panel to help contain the recycled material.
Figure 3B:
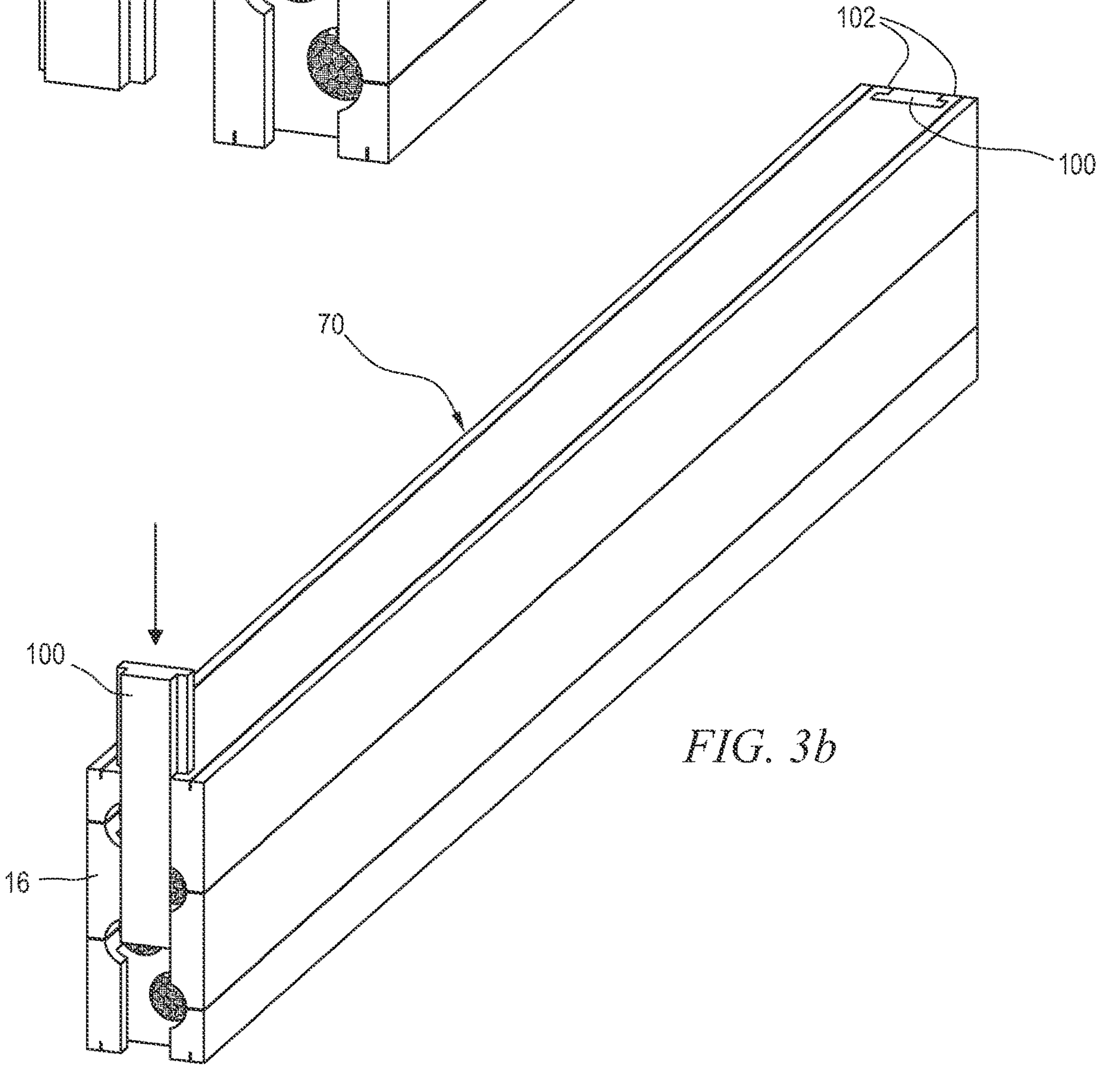

FIGS. 3*a* and 3*b* illustrate a gate cutout 100 being used on the ends of wall panel 70 to help keep recycled material 82 within channels 72. Gate cutout 100 is formed from wall panel 70 by doing a vertical cut on end surfaces 16 prior to forming channels 72. Therefore, channels 72 do not extend through gate cutout 100. Depending on the position of channels 72 in a specific embodiment and the width of the cutout, the channels may be formed through retaining ridges 102. Once channels 72 are filled with recycled material 82 as illustrated above, gate cutout 100 is reinstalled into the space it was removed from. FIG. 3*a* shows gate cutout 100 removed with recycled material 82 inserted into channels 72. FIG. 3*b* shows reinstalling gate 100 between ridges 102 where the gate cutout was originally removed from. Ridges 102 hold gate cutout 100 in place. Gate cutouts 100 cover up both ends of channels 72 to hold in recycled material 82. Gate cutouts 100 are formed with a step cut, but other shapes are used in other embodiments, e.g., a trapezoid with sides that slope out.

Figure 4A:
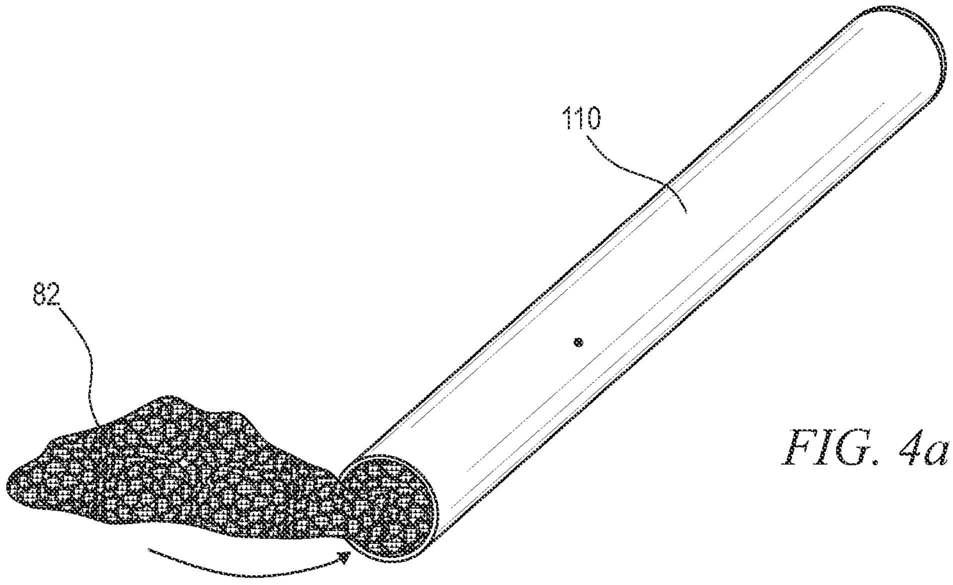
FIGS. 4*a*-4*o* illustrate forming a sound barrier wall that has the sound absorbing material in resonator tubes.
Figure 4B:
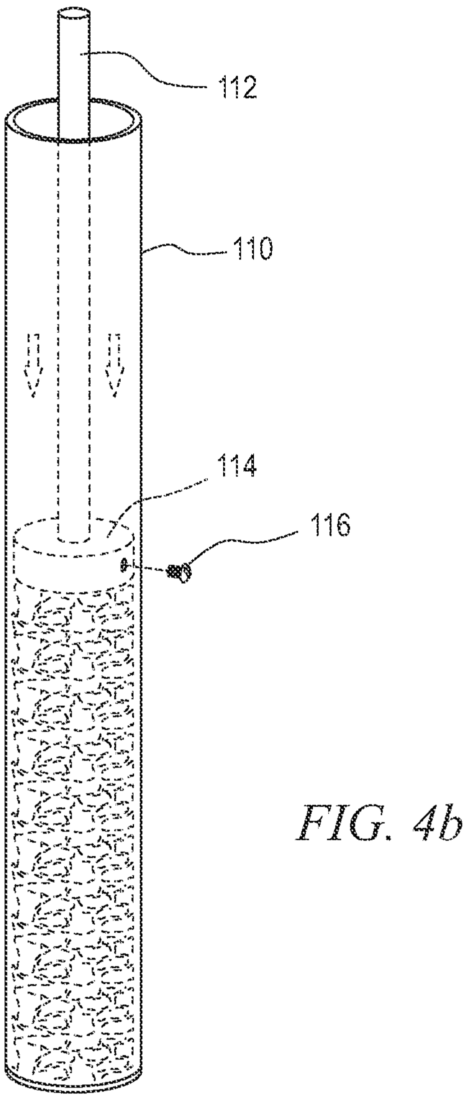
Figure 4C:
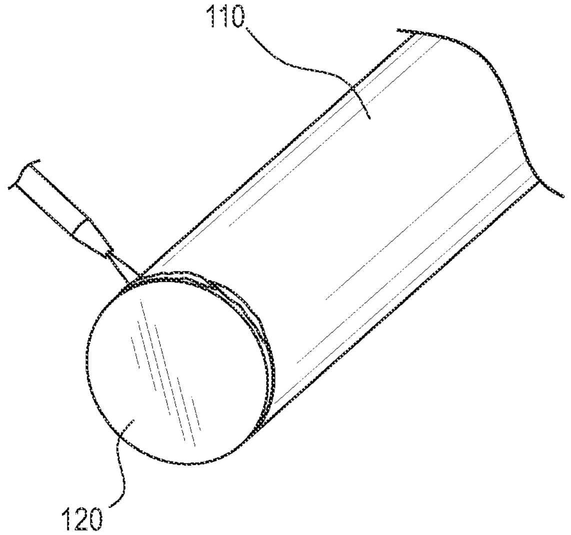
Figure 4D:
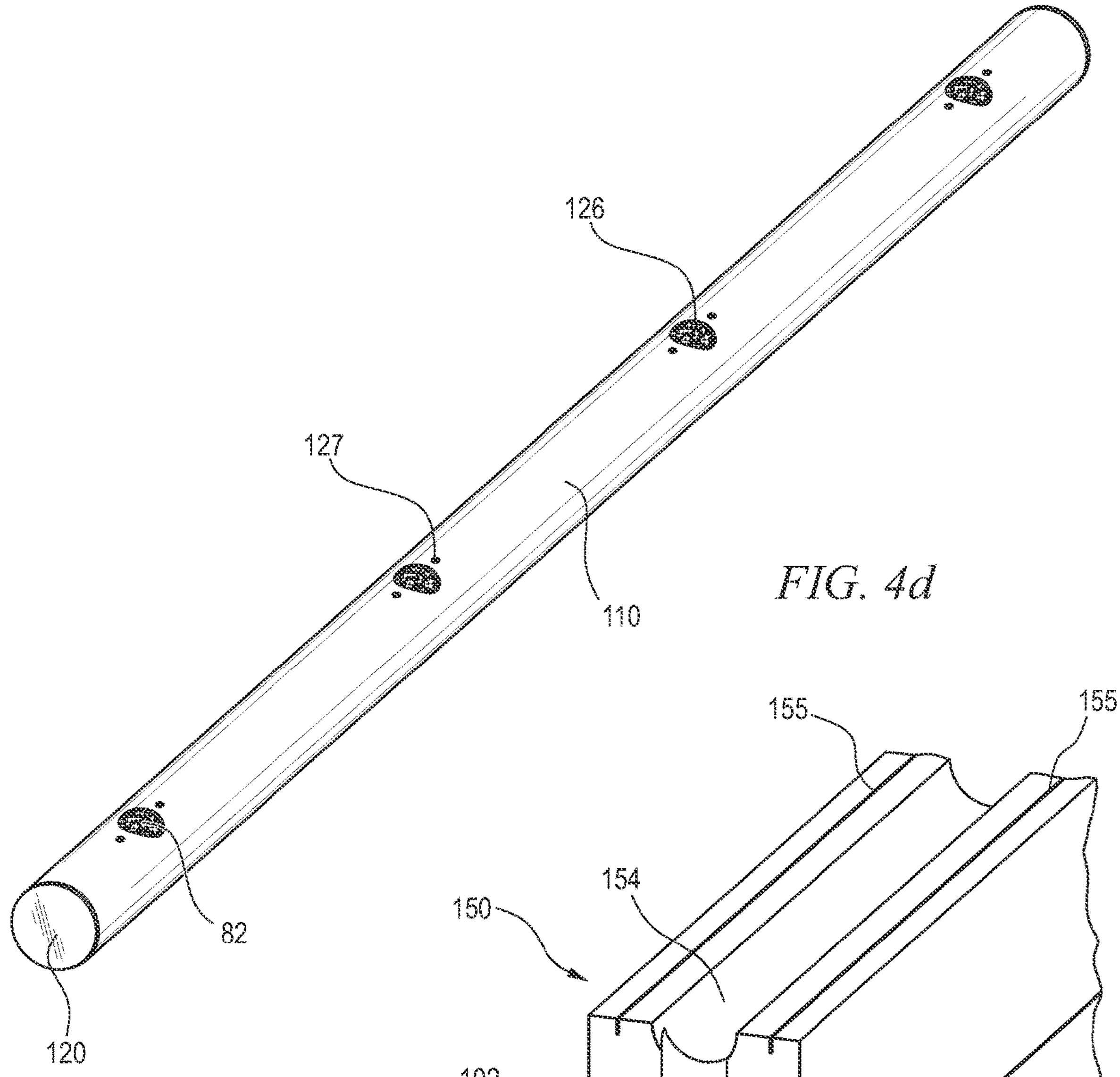
Figure 4E:
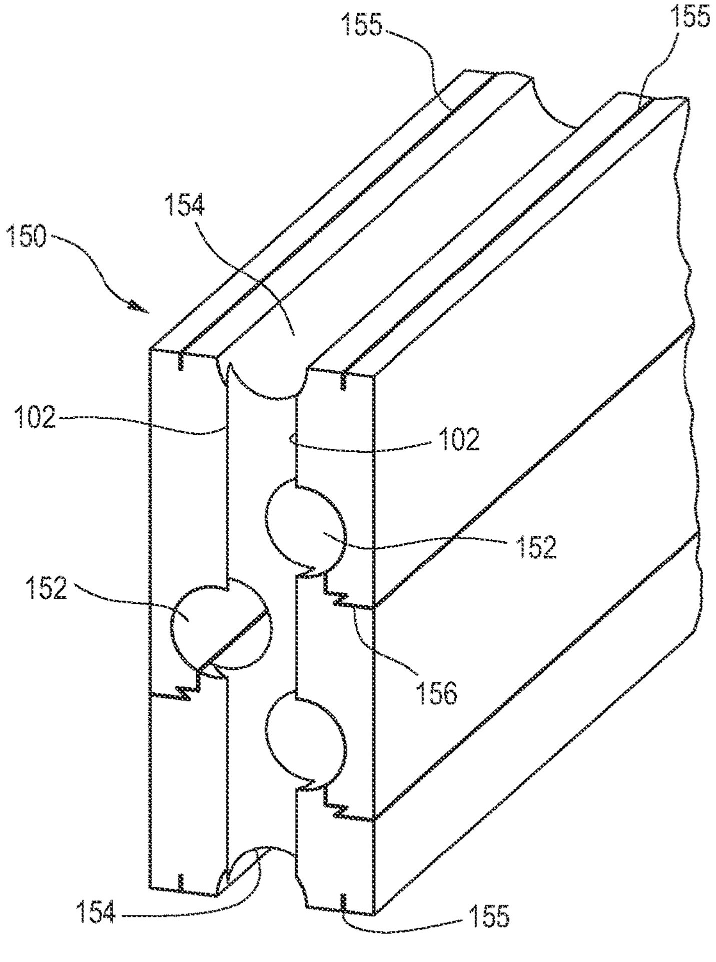
Figure 4F:
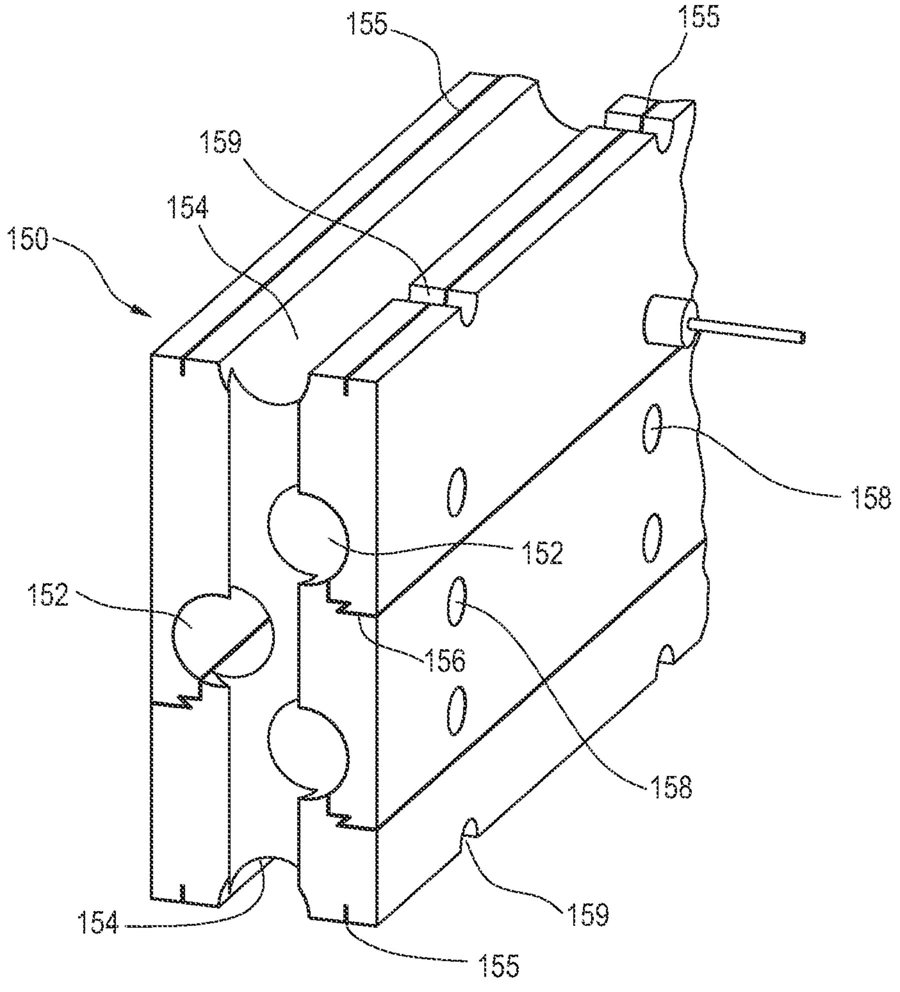
Figure 4G:
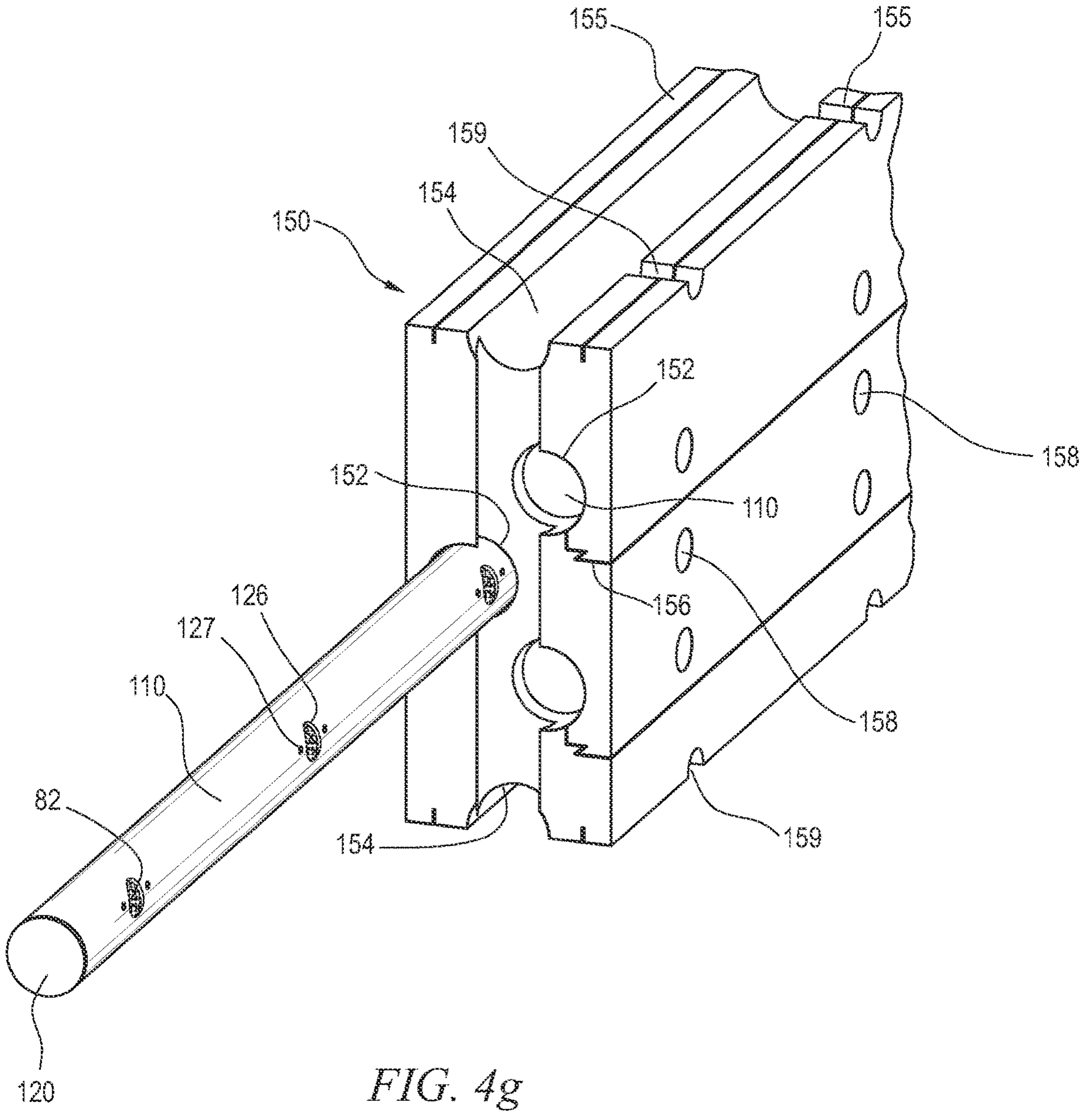
Figure 4H:
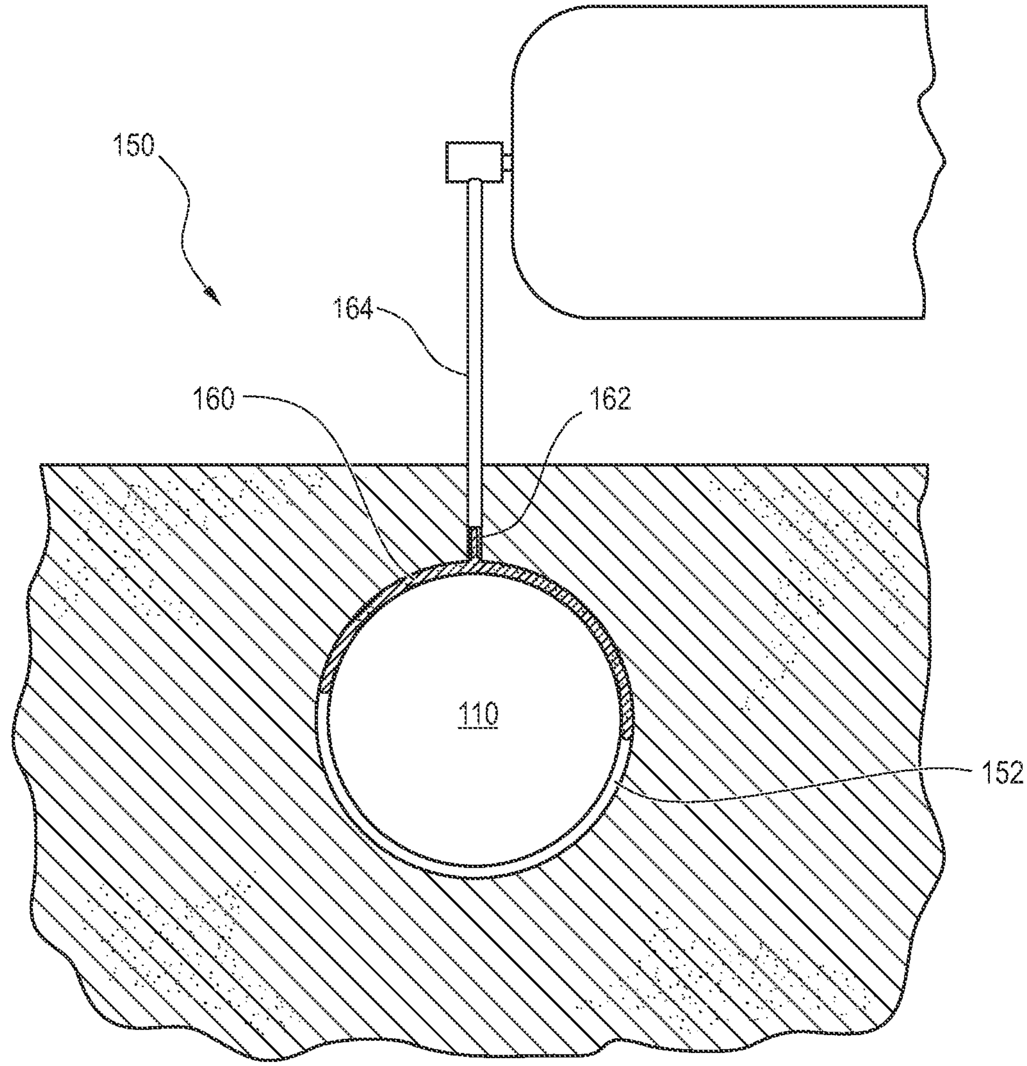
Figure 4I:
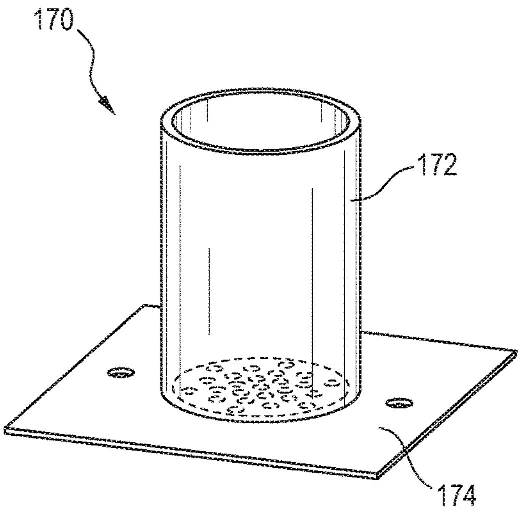
Figure 4J:
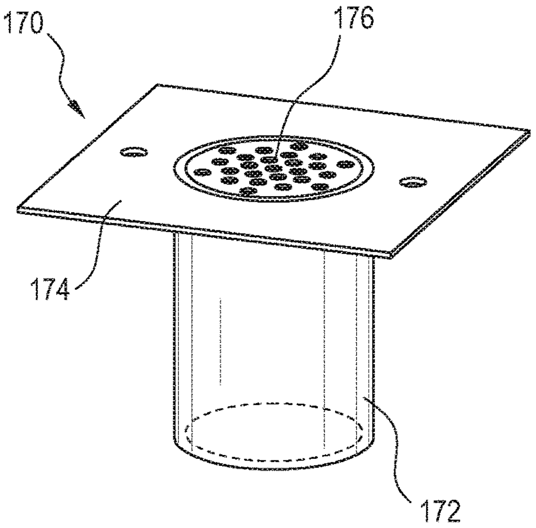
Figure 4K:
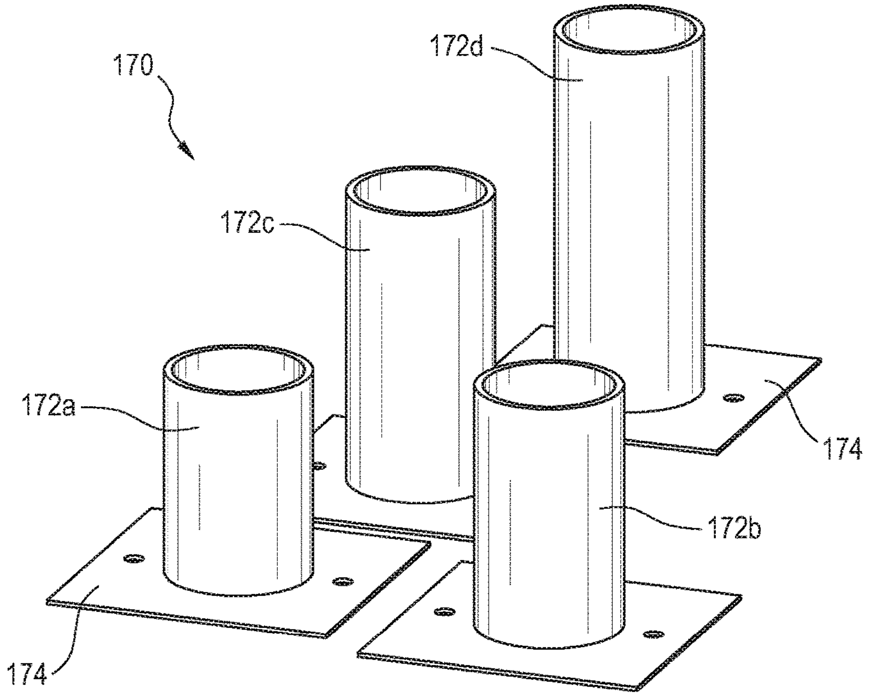
Figure 4L:
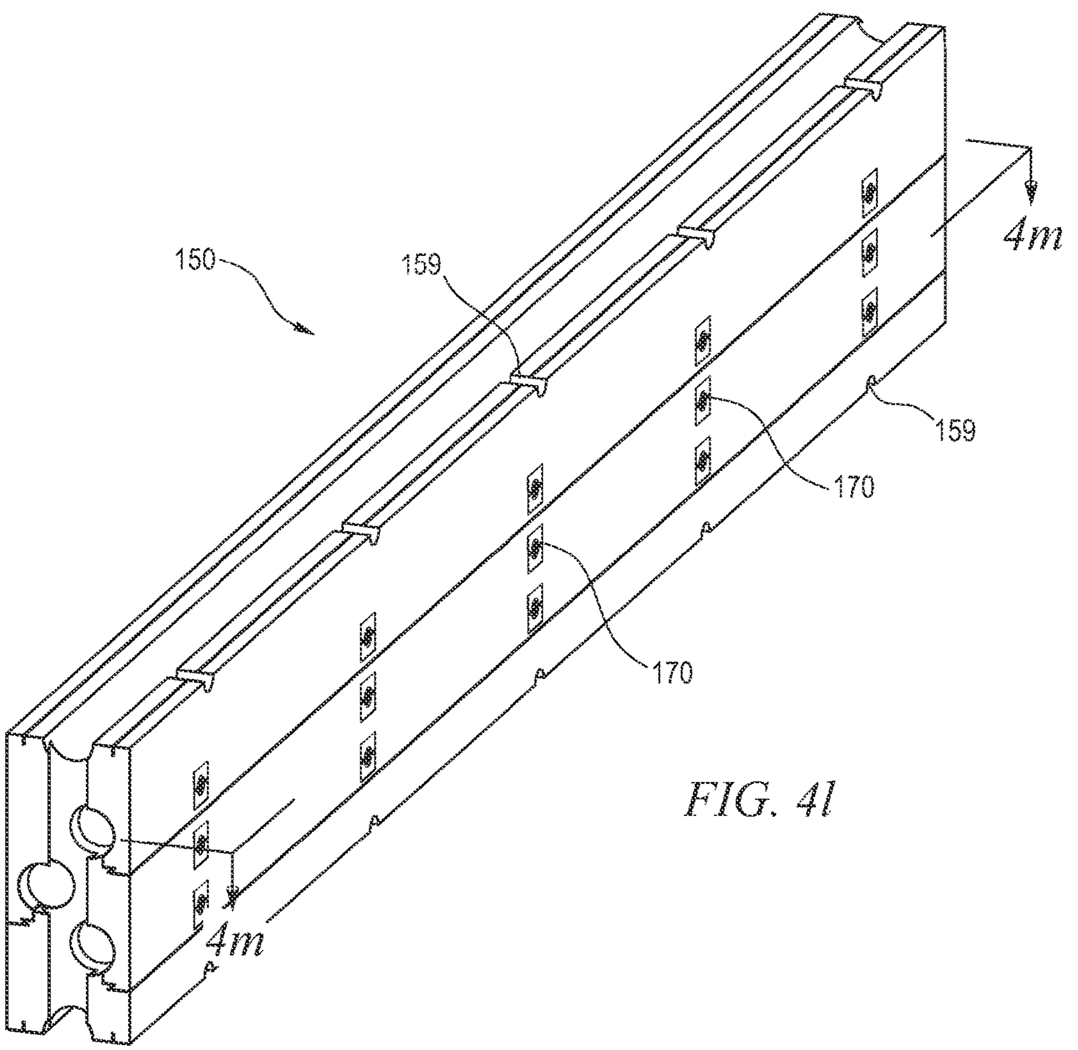
Figure 4M:
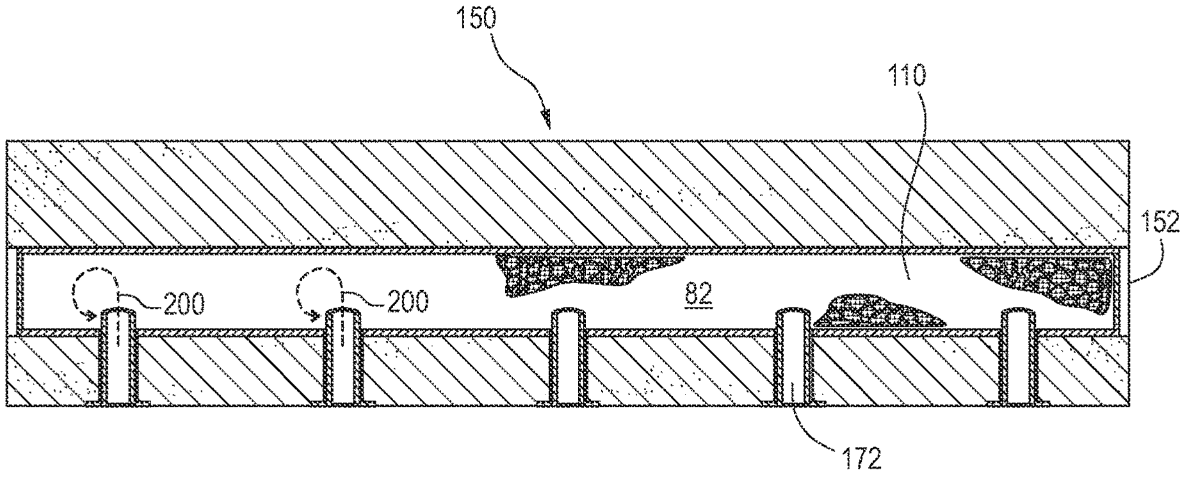
Figure 4N:
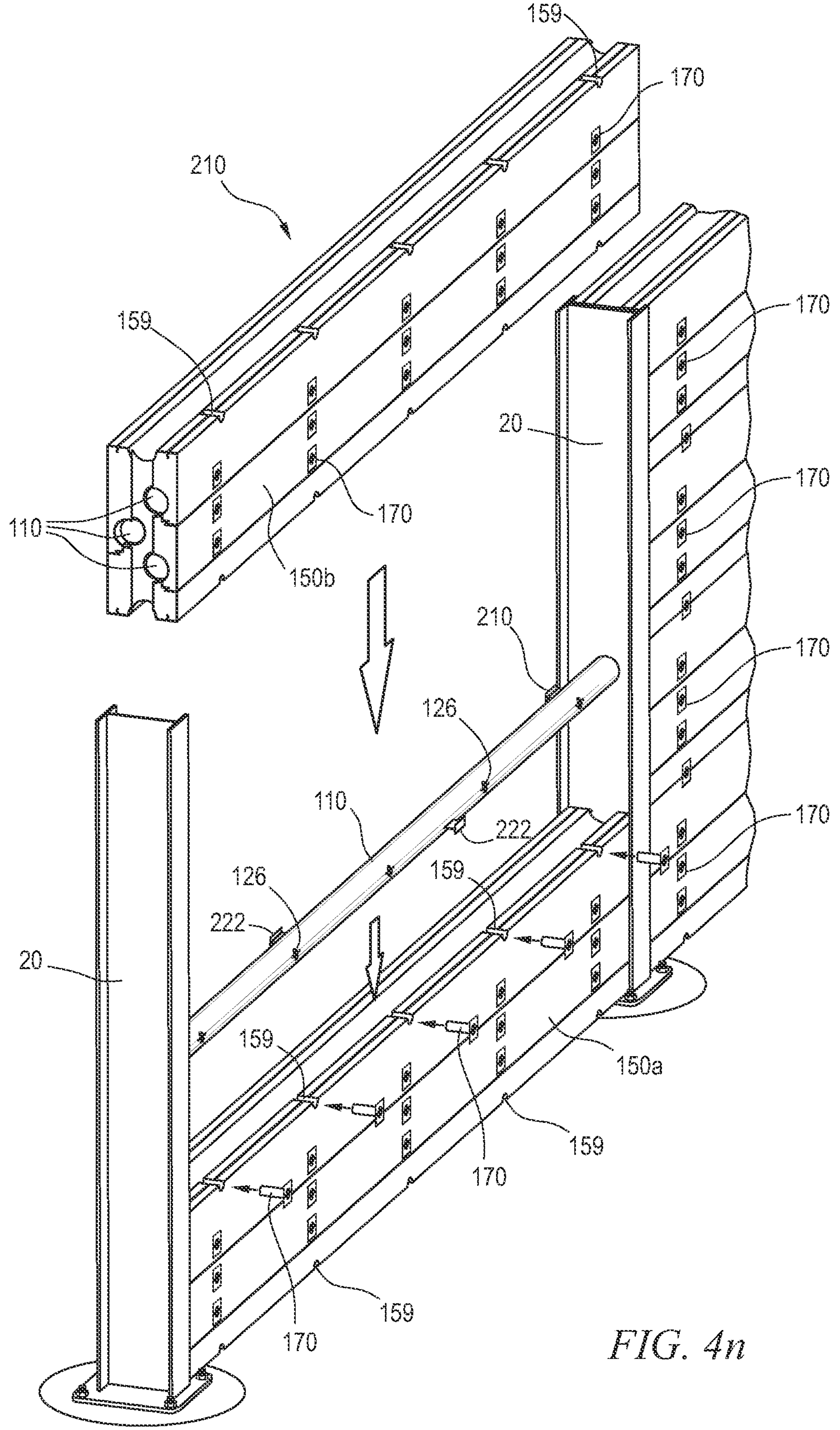
Figure 4O:
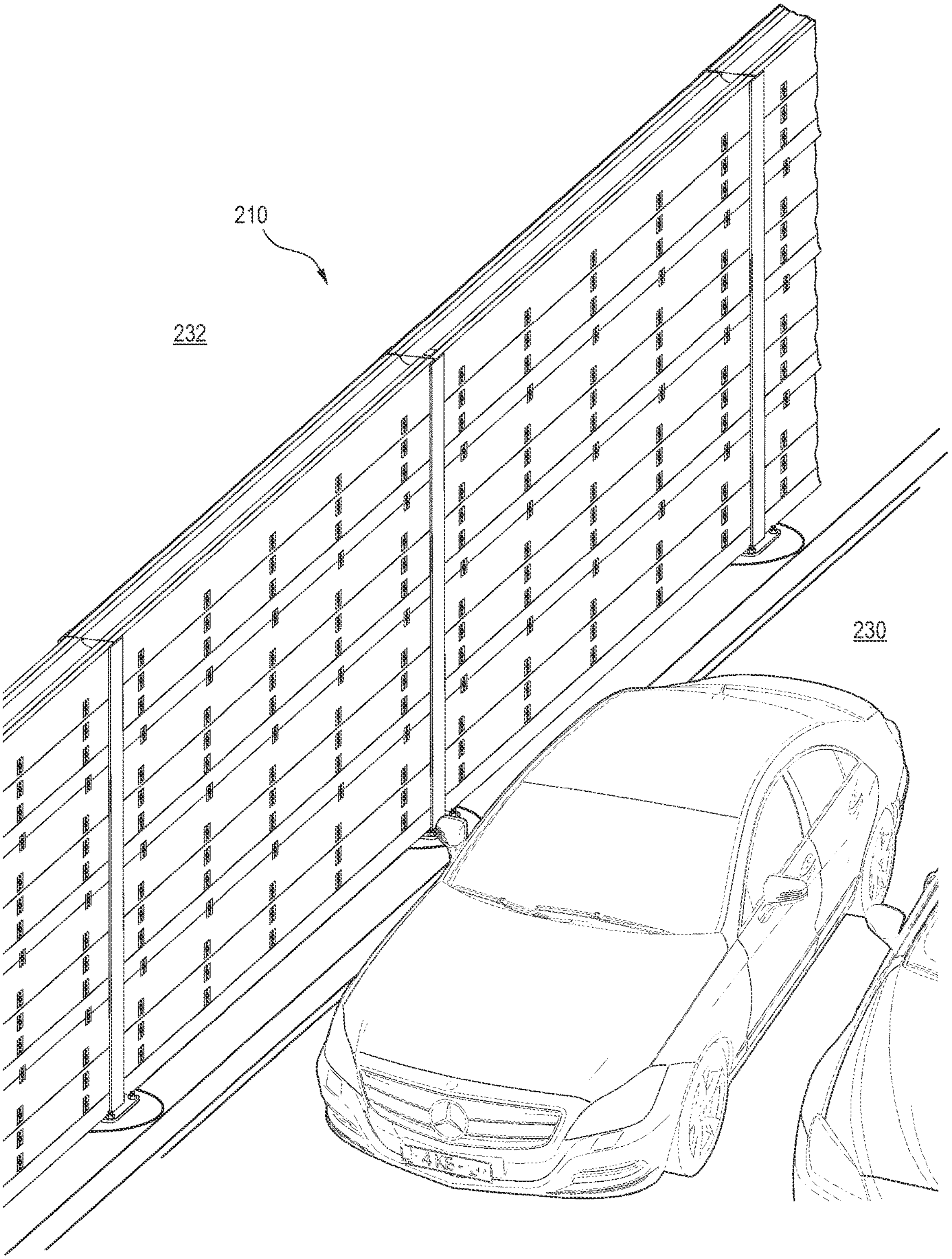

FIGS. 4*a*-4*o* illustrate forming wall panels with recycled material 82 disposed in resonator tubes 110 rather than directly within the EPS material. FIG. 4*a* shows a resonator tube 110 being filled with recycled material 82. Resonator tube 110 is a steel pipe with an inner diameter of four inches, a thickness of ¼ inch, and a length of 14 feet 10 inches in one embodiment. Resonator tube 110 is made approximately equal in length to, or slightly shorter in length than, wall panel 70, while the exact dimensions are not critical. Resonator tube 82 can be formed from steel, aluminum, copper, plastic, wood, or any other suitable material.

Recycled material 82 can be any of the materials discussed above with wall panel 70. Recycled material 82 can be disposed into resonator tube 110 by hand or using any suitable tool, such as those discussed above. One end of resonator tube 110 has a cover installed to keep recycled material 82 from falling out the other end while the resonator tube is being filled. Resonator tube 110 can be formed with one closed end rather than having a separate cap attached.

FIG. 4*b* shows an optional compression step. Recycled material 82 can be compressed down if desired using a rod or plunger 112. The plunger 112 can be used alone to compress recycled material 82. Alternatively, a disc or block 114 can be used to maintain recycled material 82 in the compressed state. Block 114 is pushed down with plunger 112, and then one or more screws 116 are installed through the sidewall of pipe 110 and into the block to hold the block in place within the pipe. Typically, a hole would be formed through the sidewall of resonator tube 110 in advance at the desired location for block 114. Screws 116 and block 114 in combination keep recycled material 82 compressed to any desired density level once compressed with plunger 112. Multiple blocks 114 can be used along the length of resonator tube 110. Block 114 is formed from metal, wood, plastic, or another suitable material.

Compressing recycled material 82 using block 114 is optional. Recycled material 82 can be compressed using plunger 112 without block 114, or simply disposed into resonator tube 110 without any specific action taken to compress the recycled material. A light pack using a rod or plunger alone provides sufficient sound dampening with a low manufacturing burden.

Once resonator tube 110 has the desired amount of recycled material 82 stuffed within the pipe, an endcap 120 is disposed on the open end to enclose the recycled material. Endcap 120 can be a metal plate with the same or similar shape as resonator tube 110 that is welded onto the pipe using a welding gun 122 or another suitable tool. In other embodiments, cap 120 is screwed on, snapped on, or attached by another suitable mechanism. End cap 120 can be the same or different from the initially installed endcap that encloses the opposite end of resonator tube 110.

In FIG. **4*d*, a plurality of inlets 126 is formed in resonator tube 110. Inlets 126 will allow sound into resonator tube 110 in the completed barrier wall. Inlets 126 are formed with a diameter slightly larger than two inches so that pieces of two-inch inner diameter pipe can be inserted into the inlets. Inlets 126 are formed by mechanically drilling into the side of resonator tube 110, or by using a laser, a punch, or any other suitable means. Inlets 126 can be formed at a regular interval along the length of resonator tube 110, e.g., every two, three, or four feet. The first and last inlets 126 can be closer to their respective ends of resonator tube 110, e.g., the inlets can be formed every four feet with the first and last inlets 18 inches from the ends. Screw holes 127 are optionally formed flanking inlets 126**.

Recycled material 82 is exposed by the formation of inlets 126. Typically, there will not be a significant amount of recycled material 82 lost through inlets 126 during production. However, a plastic wrap can be placed around resonator tube 110 to help keep recycled material 82 contained within the resonator tube if needed, e.g., for transportation from the site of filling to the site of barrier wall construction. Resonator tubes 110 filled with recycled material 82, and with inlets 126 formed, are ready to be inserted into a wall panel.

FIG. **4*e* shows one step in preparation of a foam block to form a wall panel 150. Several features are formed along the length of the foam block in FIG. 4*e*. Each of the lengthwise features in FIG. 4*e* can be formed together in one pass of the foam block through a specially formed blade or die. Alternatively, the features in FIG. 4*e* can be formed using hot wires drawn through wall panel 150, either all at once or individually. Channels 152 are similar to channels 72 above but sized to accommodate resonator tubes 110. While wall panel 70 included four channels 72, wall panel 150 is formed with 3 internal channels 152 and two half-channels 154 in the top and bottom surfaces 12. Wall panel 150 could also be formed with four internal channels 152, with or without the addition of the half-channels 154 on top and bottom surfaces 12. Any suitable number and distribution of channels 152 and 154 can be used. Grooves 155 are also formed into the top and bottom surfaces 12 of wall panel 150. Grooves 155 are thin and straight cuts as would accommodate a flange of a rolled I-beam made from a thin sheet metal. Use of grooves 155** is explained below.

The blade that forms channels 152 has a neck connected externally to wall panel 150, which has a shape illustrated by cut 156. Cut 156 includes two opposing acute angles with one side in common between the two opposing angles. The angles of cut 156 are used to limit the expansion of channel 152. When something within channel 152 presses outward, the two sides of cut 156 press against each other and limit the expansion. In addition, cut 156 is formed extending away from channels 152 rather than going directly from the channels to the nearest side surface 14. Moving cut 156 vertically allows additional features, explained below, to be added between channels 152 and side surface 14 without going through cuts 156.

For instance, holes 158 are cut into wall panel 150 in FIG. **4*f*. Holes 158 are formed perpendicular to channels 152. Holes 158 only extend from one side surface 14 of wall panel 150 to channels 152, and do not extend completely through wall panel 150. Although, holes 158 could be formed all the way through to ease manufacturing requirements or to provide sound dampening from both sides of wall panel 150. Holes 158 can be formed using a hot wire or hole saw to cut through wall panel 150 to channels 152. Holes 158 are formed in positions along channels 152 that correspond to the positions of inlets 126 formed along resonator tubes 110. Holes 158 are formed with a 2-inch or slightly larger diameter in one embodiment. Half-holes 159 are formed down to half-channels 154 in a similar manner to holes 158**.

Holes 158 and half-holes 159 are each formed at the exact same locations for each channel so that each resonator tube 110 can be formed with the exact same inlet 126 distribution. Making each resonator tube 110 the exact same results in easier manufacturing requirements. In other embodiments, holes 158 and inlets 126 can be laterally offset from those above and below. After channels 152 and holes 158 are formed, resonator tubes 110 are inserted into the channels as shown in FIG. **4*g*. Resonator tubes 110 are turned so that inlets 126 line up with holes 158. A resonator tube 110 is inserted into each channel 152. Half-channels 154** remain empty for now.

Due to the way EPS blocks are manufactured and shaped, it can be difficult to get channels 152 to have the exact right diameter to hold resonator tubes 110. FIG. **4*h* shows an optional step of filling a gap in channels 152, between resonator tubes 110 and the remaining EPS material, with an expanding foam spray 160. First, holes 162 are drilled down to resonator tubes 110. Drilling can be using a normal drill bit, a laser, a hot wire, or any other suitable means. Holes 162 can be formed every foot or two between inlets 126. Holes 162 could alternatively or additionally be formed through the opposite side of wall panel 150 from inlets 126. Any suitable distribution of holes 162 can be used as needed to provide sufficient foam 160 to hold resonator tubes 110** in place.

After drilling holes 162, a straw or other applicator 164 is inserted into the holes. Expanding foam is distributed through applicator 164 to fill the remaining gap in channels 152 with foam. The expanding foam can be deposited from an aerosol can or another container. Foam 160 reduces the amount of vibration that resonator tubes 110 experience within channels 162. Excessive vibration of resonator tubes 110 could reduce the sound dampening capabilities of wall panel 150.

FIGS. **4*i*-4*k* illustrate an inlet assembly 170. Assembly 170 is formed out of an inlet pipe 172, a cover plate 174, and a vent or screen 176. Inlet pipe 172 is a two-inch inner diameter steel pipe. Inlet pipe 172 is cut to a length allowing the inlet pipe to extend one inch into resonator tube 110 from the front-facing side surface 14 of wall panel 150. FIG. 4*k* shows multiple different lengths of inlet pipe 172, which are used to accommodate the lateral offset between channels 152 formed in wall panel 150. Resonator tubes 110 within a single wall panel 150 can be different distances from side surface 14 and therefore utilize different lengths of inlet pipes 172. Inlet pipe 172*a* is the shortest, 172*b* is slightly longer, 172*c* is longer still, and 127*d* is the longest pipe. The length of inlet pipe 172 used depends on the distance of a specific resonator tube 110 from side surface 14**.

To form assembly 170, a piece of sheet metal is first cut to size for plate 174. Steel with an ⅛-inch thickness is used in one embodiment. Plate 174 is sized to extend outward approximately one inch in each direction from pipe 172 once assembled. For a two-inch diameter pipe 172, a four-inch square plate 174 will work. Vent 176 can be formed by simply forming holes in plate 174. Alternatively, an opening can be formed in plate 174 and then a separate thinner piece of sheet metal can be welded onto the hole as vent 176. The holes of vent 176 are formed to a sufficient size and number to let in sound waves but small enough to keep out birds, other living creatures, debris that may be picked up by the wind, etc. Two screw holes 182 are formed flanking sound hole 180.

Pipe 172 is set onto screen 176 and then welded to screen 176 and plate 174. Any suitable number and distribution of weld joints can be used. In other embodiments, a mechanical fastener or other mechanism is used to connect pipe 172, screen 176, and plate 174. Assembly 170 can be formed as a single uniform piece of material, e.g., by molding a metal or plastic material into the desired shape.

In FIG. 4*l*, inlet assemblies 170 are disposed with pipe 172 extending through holes 162 and into resonator tube 110. Plate 174 sits on side surface 14 of wall panel 150. Screws or bolts are disposed through screw holes 182 and threaded into screw holes 127 of resonator tube 110 to hold in assemblies 170. The bolts can be tightened down until plates 174 sink into the EPS material of wall panel 150 with the front surfaces of wall panel 150 and plates 174 coplanar to create an overall flat side surface 14.

FIG. 4*m* shows a cross-sectional view of resonator tubes 110 and inlet assemblies 170 installed in wall panel 150. Sound waves 200 are received into resonator tube 110 through screen 176 and inlet pipe 172. Once inside resonator tube 110, sound waves 200 bounce around through recycled material 82 and off the walls of the resonator tube until the energy of the sound waves is dissipated. Having inlet pipes 172 extend an inch into resonator tube 110 helps reduce the amount of sound waves 200 that reenter the inlet pipes and exit back out into the ambient area. A sound wave 200 that is traveling along the circumference of resonator tube 110 will hit the outside of inlet pipe 172 rather than following the resonator tube back into the inlet pipe.

In some embodiments, the type and density of recycled material 82 can be configured along with the size of resonator tubes 110 to create a resonating chamber harmonically tuned to cause destructive interference for frequencies of interest, e.g., common frequencies associated with engine noise when the barrier wall is being built alongside a highway. Resonator tubes 110 can be formed to operate similarly to a vehicle muffler or firearm silencer.

FIG. 4*n* shows a barrier wall 210 being constructed using completed wall panels 150. After erecting vertical supports 20 as above, a first wall panel 150*a* is disposed between the vertical supports. The first wall panel 150*a* can be disposed directly on the ground, on some sort of foundation, e.g., a concrete slab, on a traffic barrier, or on any other suitable base. Inlet assemblies 170 are oriented toward the side of barrier wall 210 which generates the noise of concern, e.g., toward the highway. A resonator tube 110 is disposed on top of wall panel 150*a* within half-channel 154.

Resonator tube 110 optionally has wings 222 welded or otherwise attached. Wings 222 extend laterally from resonator tube 110 and turn perpendicularly up and down to extend into grooves 155. Wings 222 can be formed from sheet metal bent or formed into a right angle. The sheet metal can be steel, aluminum, or any other suitable material. Wings 222 can be formed by metal rolling. The folding can include one 90-degree angle and one 180-degree angle to get a single T-shaped piece of sheet metal with a flange that goes in two different directions. Alternatively, each wing 222 may have only a single 90-degree turn, and the wings alternate with some extending upward and some extending downward.

A second wall panel 150*b* is stacked on top of the first wall panel 150*a* with resonator tube 110 being disposed within half-channel 154 and grooves 155 on the bottom of the second wall panel. Resonator tube 110 extends into half-channels 154 of both wall panels 150*a* and 150*b*. Wings 222 extend into grooves 155 of both wall panels 150*a* and 150*b*. Each wing 222 may extend into grooves 155 of both wall panels 150*a* and 150*b,* or approximately half the wings extend into each wall panel. Wall panel 150*b* rests on wall panel 150*a.* Foam 160 can be sprayed between wall panels 150*a* and 150*b* to secure resonator tube 110 if desired.

Wall panels 150 and resonator are continually stacked, with a resonator tube disposed between each pair of adjacent wall panels, until barrier wall 210 reaches a desired height. Inlet assemblies 170 can be added to the intermediate resonator tubes 110 as each new block 150 is added, or all inlet assemblies can be added after all blocks are stacked. Alternatively, inlet assemblies 170 can be attached to resonator tubes 110 prior to installing the tubes between blocks 150. Additional vertical supports 20 can be formed to add length to the wall, with more wall panels 150 and resonator tubes 110 stacked within the additional vertical supports. Barrier wall 210 can be formed to any desired length and path.

FIG. 4*o* shows the completed barrier wall 210. Barrier wall 210 reduces the amount of noise from roadway 230 that reaches neighborhood 232. Barrier wall 210 may also have a stucco or other finish on its faces to create a more pleasing aesthetic design. Road noise is absorbed by the EPS material of wall panels 150. Road noise also enters resonator tubes 110 via inlet pipes 172. The road noise in resonator tubes 110 bounces around within the resonator tubes and is absorbed by recycled material 82. Adding resonator tubes 110 to barrier wall 210 significantly increases the noise dampening capability of the wall because noise is trapped in the resonator tubes and can be dissipated over a longer time period compared with wall panel 70 where the sound waves only get one pass through recycled material 82.

Figure 5A:
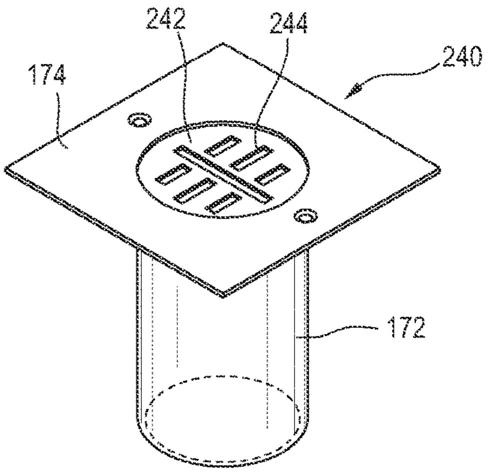
FIGS. 5*a*-5*e* illustrate alternative designs for resonator tube inlet screens.
Figure 5B:
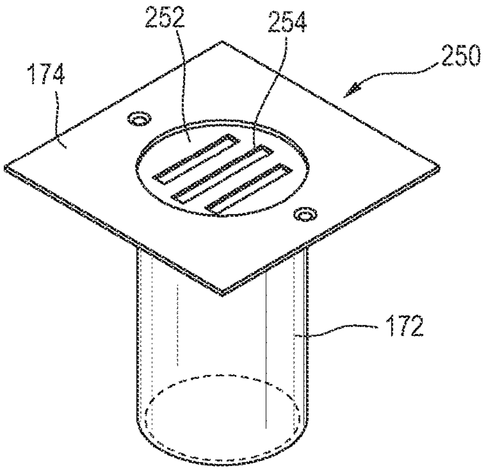
Figure 5C:
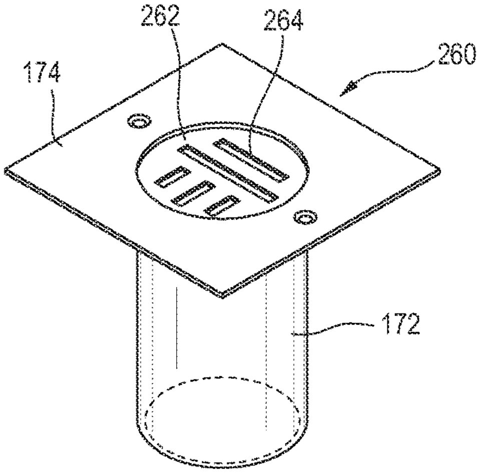

FIGS. 5*a*-5*e* show various slot designs for the screen in inlet assembly 170. FIG. 5*a* shows screen 240 with one long slot 242 down the middle of the screen and three perpendicular slots 244 on either side of the central slot. FIG. 5*b* shows screen 250 with three slots 252 that extend for nearly the entire length of the screen in parallel. FIG. 5*c* shows screen 260 with two parallel slots 262 nearly the entire length of the screen and three slots 264 perpendicular to and extending from the first slots 262 to the other edge of the screen. Any number of parallel slots can be formed, and any number of perpendicular slots can be formed on either or both sides of the parallel slots. Any size and orientation of slots can be used. The screens can be disposed on the barrier wall rotated in any direction. In some embodiments, the screen slots are tuned to ensure certain audible frequencies of concern are let through to resonator tube 110.

Figure 5D:
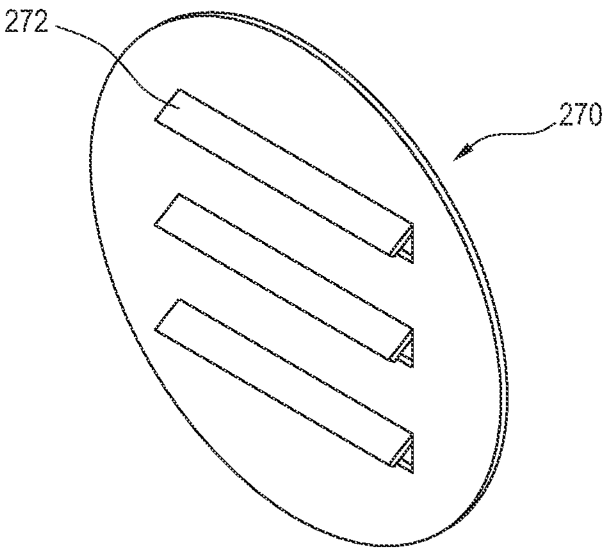

FIG. 5*d* shows a screen 270 where the slots are formed with folded-out tabs 272 instead of drilled holes. Tabs 272 are formed by using punched louvers in one embodiment. Screen 270 is installed with tabs 272 extending away from the barrier wall to help keep rain from flowing into inlet pipes 172. Tabs 272 operate like eaves to redirect water away from the slot openings. Any screen embodiment can be formed with folded out tabs instead of plain holes.

Figure 5E:
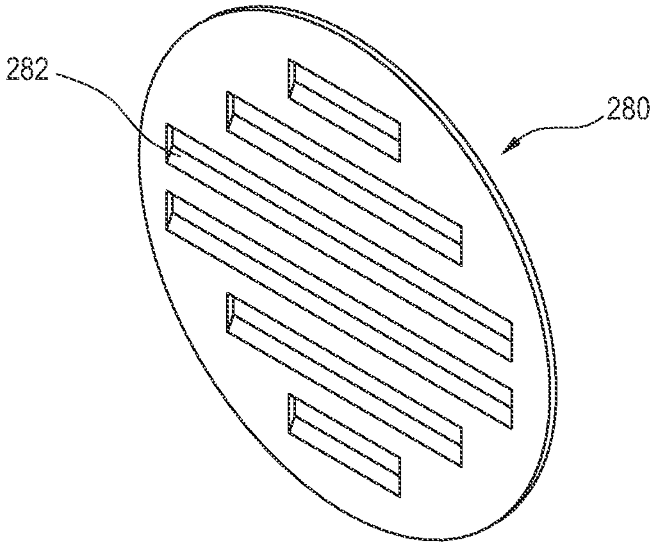

Another option for redirecting rain is to slope the holes themselves away from inlet pipes 172. FIG. 5*e* shows a cross-sectional view of a screen 280 with sloped holes 282. The sloped surfaces of holes 282 push water out of inlet assembly 170. Any of the above embodiments with screen holes can have the holes formed at an angle to provide a downward slope out of the wall panels.

Figure 6A:
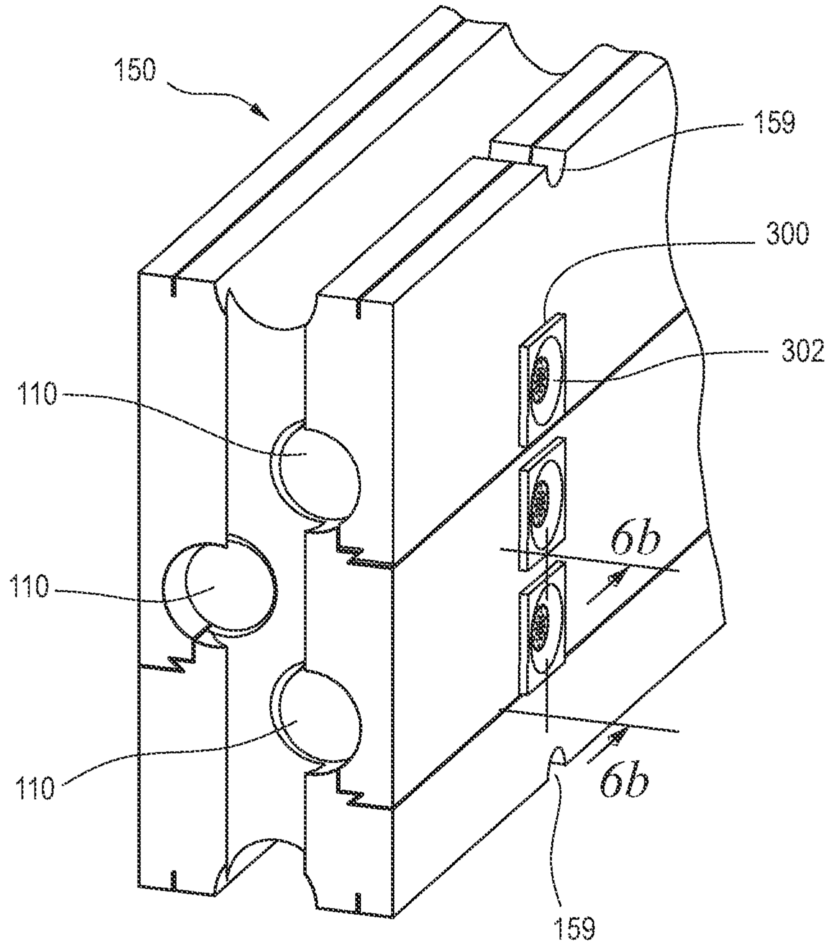
FIGS. 6*a*-6*e* illustrate a conical overlay on a barrier wall.
Figure 6B:
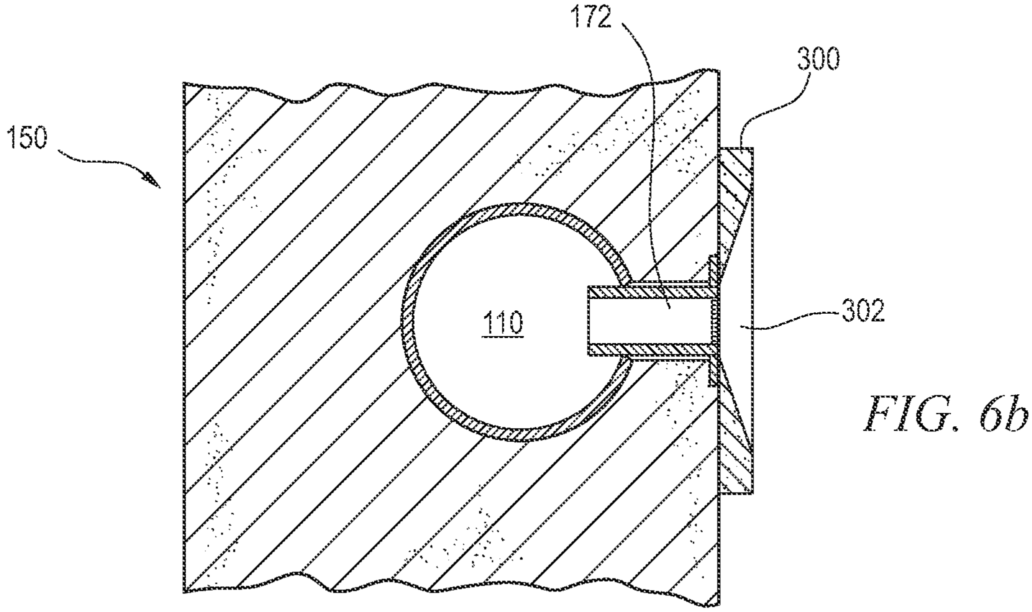

FIGS. 6*a*-6*e* show a facade with conical openings that can be formed over the front of barrier wall 210. FIGS. 6*a* and 6*b* show facade 300 with a symmetrical cone 302 cut out of the facade over inlet assembly 170. Facade 300 is a sheet of EPS material in one embodiment. The EPS sheet for facade 300 can be the size of an entire section of barrier wall 210, the size of a wall panel 150, or individual pieces of facade 300 can be manufactured for each inlet assembly 170 and sized so that each piece of the facade touches adjacent pieces on all sides. Cones 302 are cut out using a hot wire. Other materials and manufacturing methods are used in other embodiments.

Cone 302 over inlet assemblies 170 provides multiple benefits. The cone shape helps direct sound waves from a wider area into inlet assembly 170. Sound power received over the larger surface area of cone 302 is concentrated down into inlet assembly 170. Additionally, cone 302 helps with keeping rain water out of inlet assembly 170. The top part of cone 302 keeps water running down barrier wall 210 further from inlet assembly 170 than without facade 300. The bottom part of cone 302 ensures that water entering the volume of the cone flows away from inlet assembly 170.

Figure 6C:
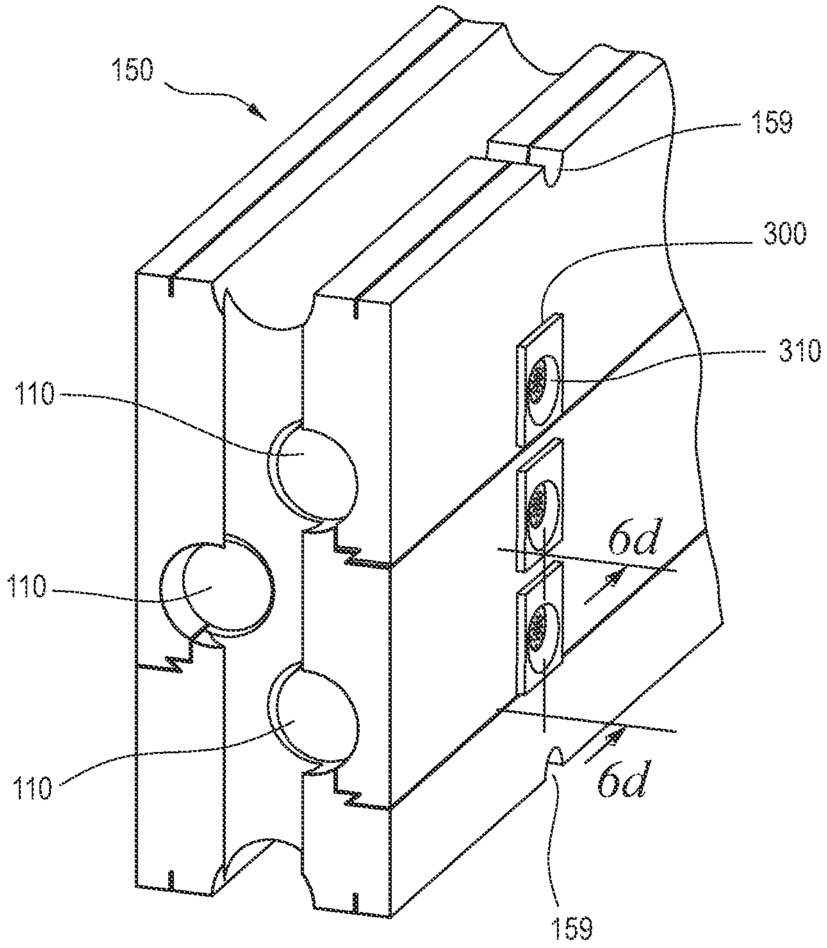
Figure 6D:
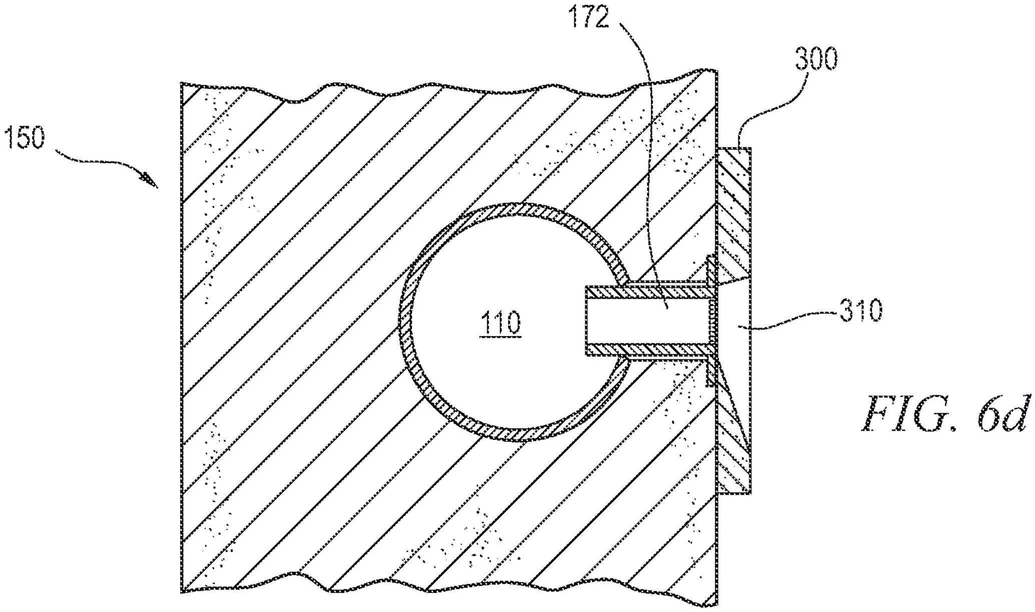

The rain repelling benefits of cone 302 can be enhanced by making the cone off-centered as illustrated by cone 310 in FIGS. 6*c* and 6*d*. The edge of cone 310 above inlet assembly 170 is lower so the likelihood of rain blowing into the inlet assembly is reduced. Moreover, the angle of cone 310 above inlet assembly 170 is more horizontal so there is a less likelihood of water flowing down the cone and into the inlet assembly. A facade 300 can be formed with any size and shape of cone. The cone shape can be circular, oval, square, rectangular, polygonal, or any other suitable shape. The sloped surfaces can be linear as illustrated, parabolic, or have any other suitable profile. A larger cone may funnel more sound into inlet assembly 170 while reducing the effectiveness of the cone at repelling rain. In one embodiment, the top edge of the cone forms an acute angle, such that the top of screen 176 is at a higher level than the top of the outer opening of the cone.

Figure 6E:
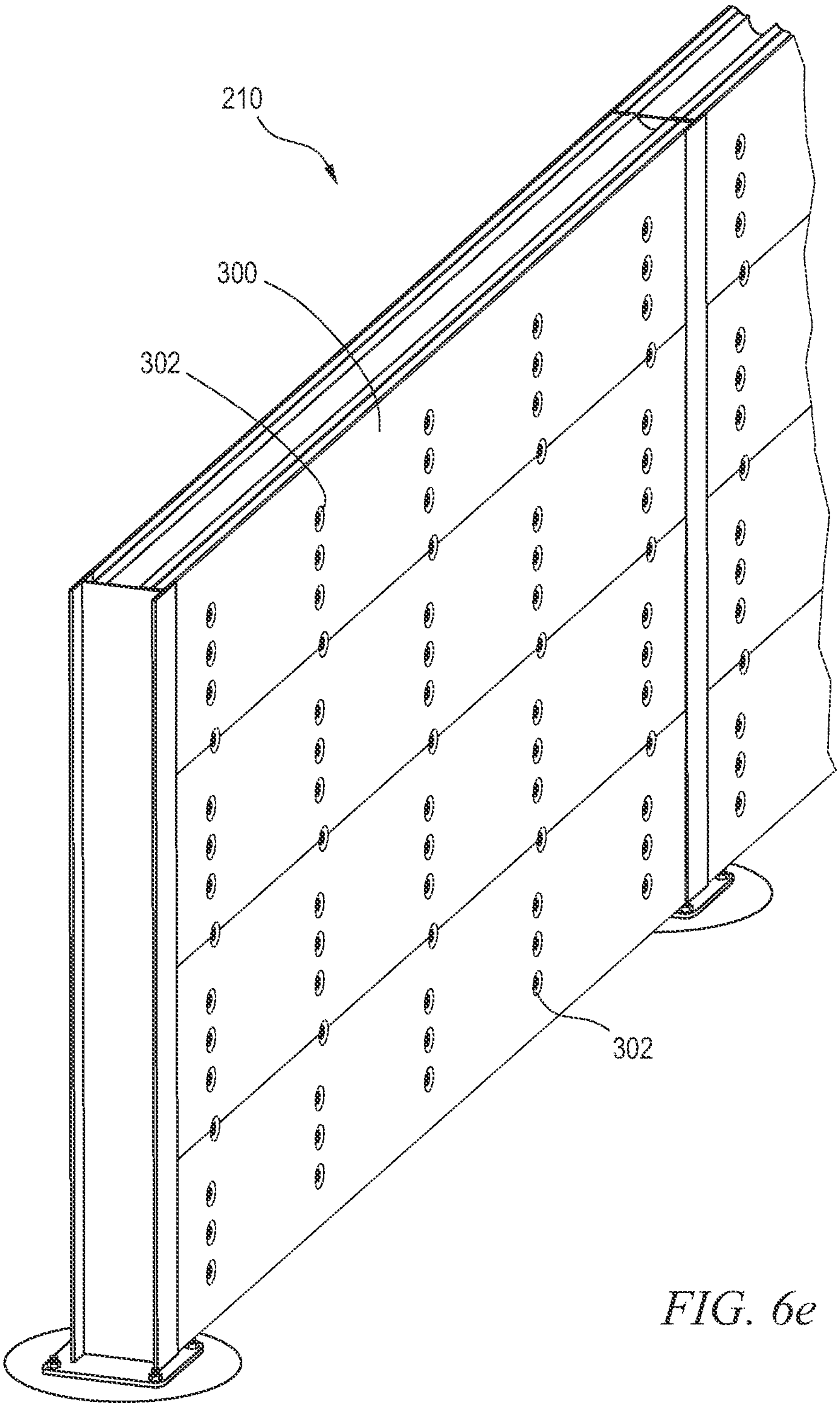

FIG. 6*e* shows barrier wall 210 with facade 300 installed. Each inlet assembly 170 of the wall has a cone 302 extending from sound hole 180 of plate 174. Using facade 300 increases both sound dampening capability and weather resistance of barrier wall 210.

Figure 7:
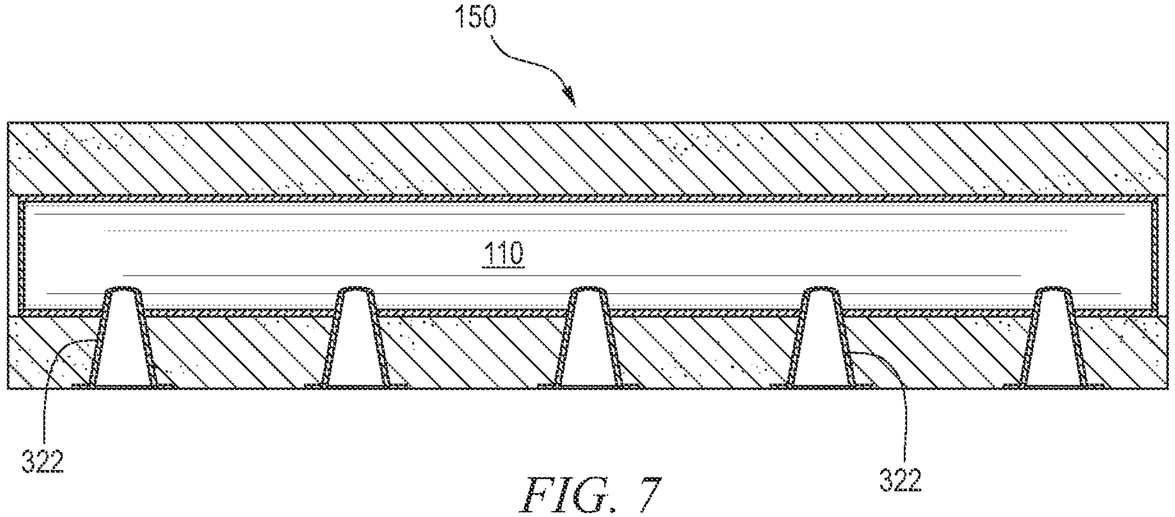
FIG. 7 illustrates a conical inlet pipe.

FIG. 7 shows an inlet assembly 320 with a conical inlet pipe 322. Inlet pipe 322 being conical provides many of the same benefits as facade 300 but is embedded within wall panel 150 instead of disposed over the front surface. The conical shape of inlet pipe 322 funnels sound into the smaller inlet opening 126 of resonator tube 110. The sloped surfaces also help repel rain in the same manner as cone 302. Rather than being conical, a cylindrical inlet pipe 172 can be oriented to slope downward from resonator tube 110 as opposed to being horizontal as illustrated above. The downward sloped inlet pipe 172 can be used in conjunction with a conical overlay to provide additional benefit.

FIGS. 8*a*-8*d* shows an inlet assembly 330 with a beveled inlet pipe 332. Beveled opening 334 helps guide incoming sound laterally. With the perpendicular cut of inlet assembly 170, sound may tend to bounce off the opposite side of resonator tube 110 and back out the same inlet. The beveled opening 334 sends more sound waves bouncing laterally to reduce immediate echo back out the same inlet.

Figure 8A:
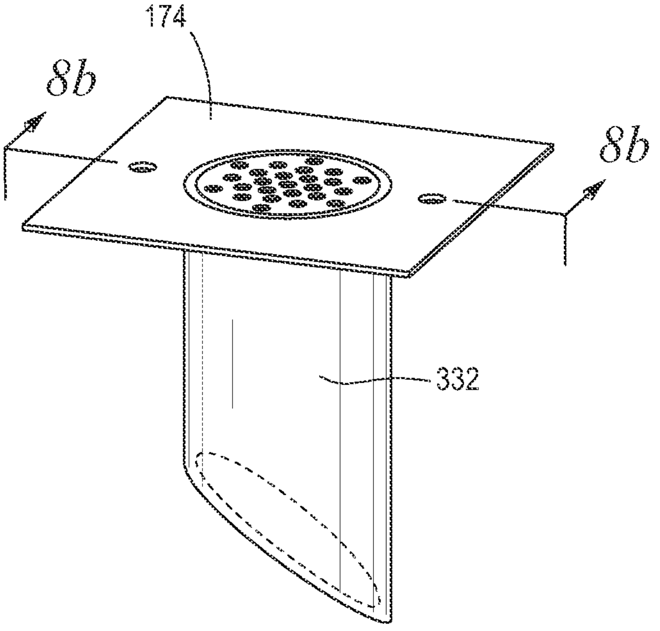
FIGS. 8*a*-8*d* illustrate a beveled inlet pipe.
Figure 8B:
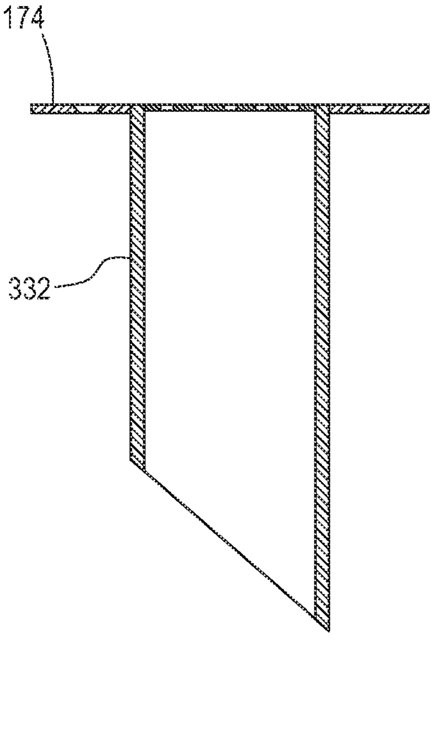
Figure 8C:
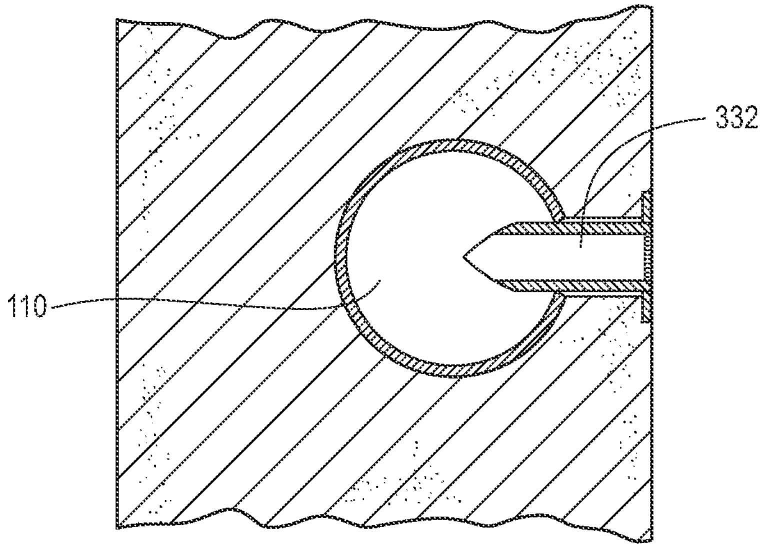
Figure 8D:
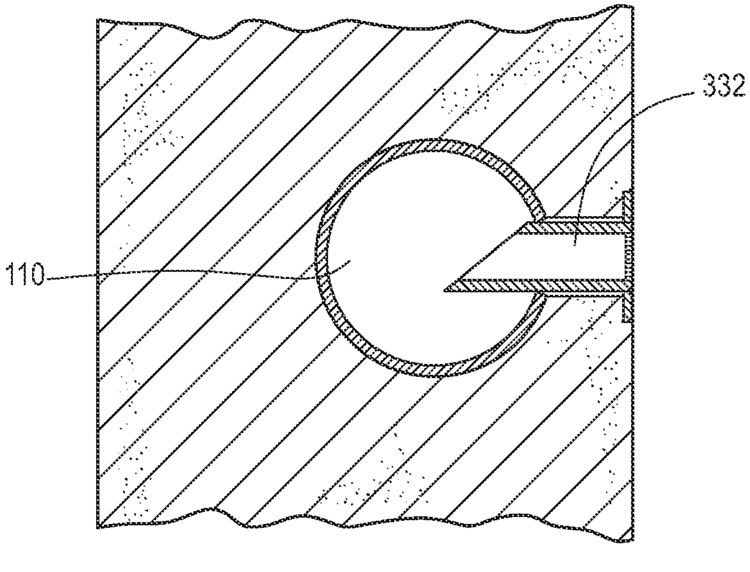

FIG. 8*c* shows the beveled surface 334 oriented sideways to send sound waves bouncing along the length of resonator tube 110. FIG. 8*d* shows beveled surface 334 oriented vertically, which guides sound waves directly into the sidewall of resonator tube 110 above or below the inlet rather than directly across from the inlet. The exact angle of inlet assembly 330 can be configured to provide the best sound dampening for a given embodiment through trial and error. The angle can be any angle across an entire 360-degree circle, not just horizontal or vertical as illustrated.

Figure 9:
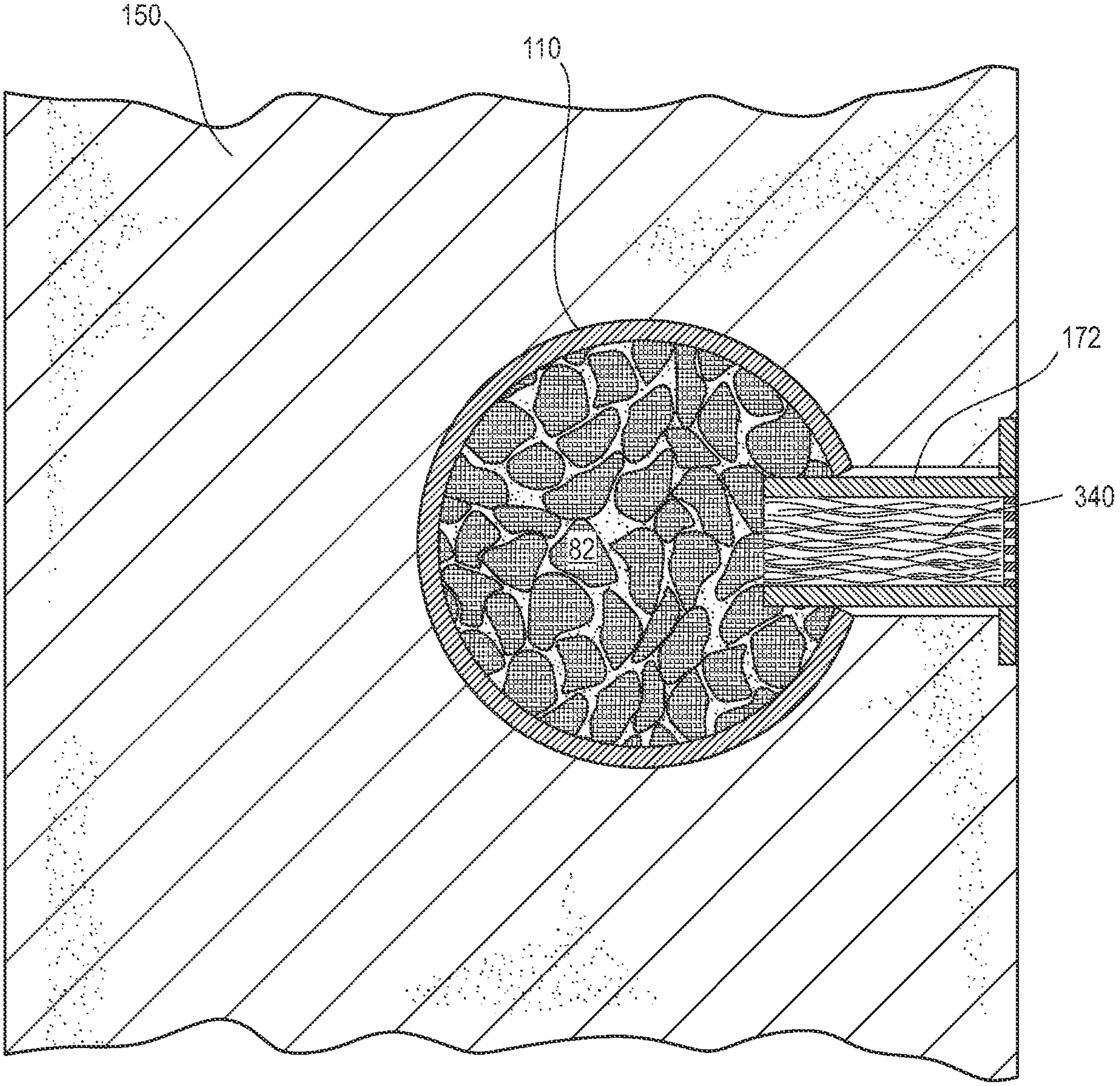
FIG. 9 illustrates filling the inlet pipe with mineral wool.

FIG. 9 illustrates filling inlet pipe 172 with mineral or rock wool 340. Rock wool 340 provides multiple benefits. First, rock wool 340 helps dampen sound waves traveling through inlet pipe 172. Second, rock wool 340 helps keep water that enters inlet pipe 172 from flowing into resonator tube 110. Rock wool 340 is waterproof, unlike recycled material 82 in many embodiments. Rock wool 340 is going to significantly reduce the flow of water through inlet pipe 172. Third, rock wool 340 mitigates the negative impacts of water that does happen to get into inlet pipe 172. Rock wool 340 can get wet with no significant negative consequences, whereas recycled material 82 may get moldy and stinky. Without rock wool 340, water in inlet pipe 172 may flow to recycled material 82 and potentially cause said problems. Rock wool 340 does not itself get moldy and stinky, and reduces the likelihood of water reaching recycled material 82 which might do so.

Figure 10A:
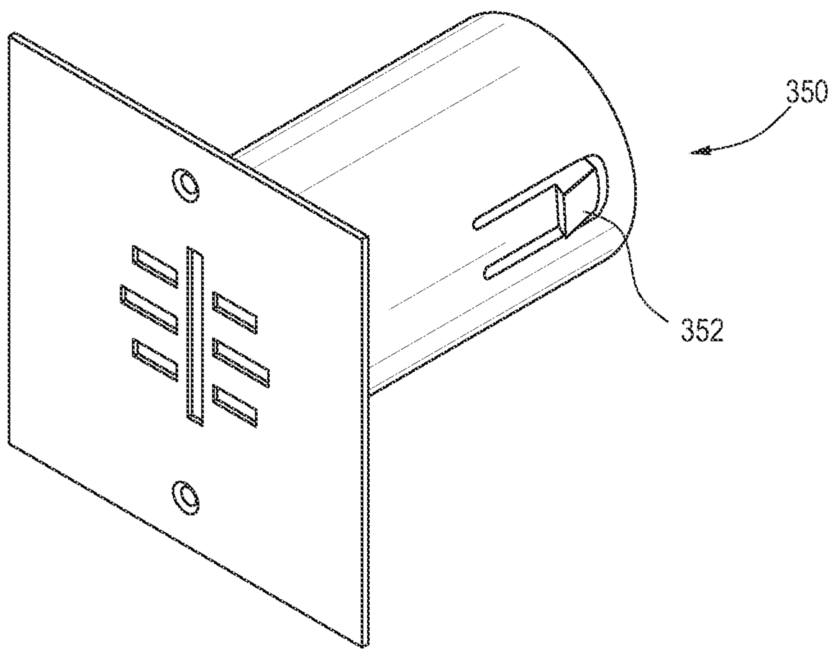
FIGS. 10*a* and 10*b* illustrate a molded plastic inlet pipe with built-in snap locks.
Figure 10B:
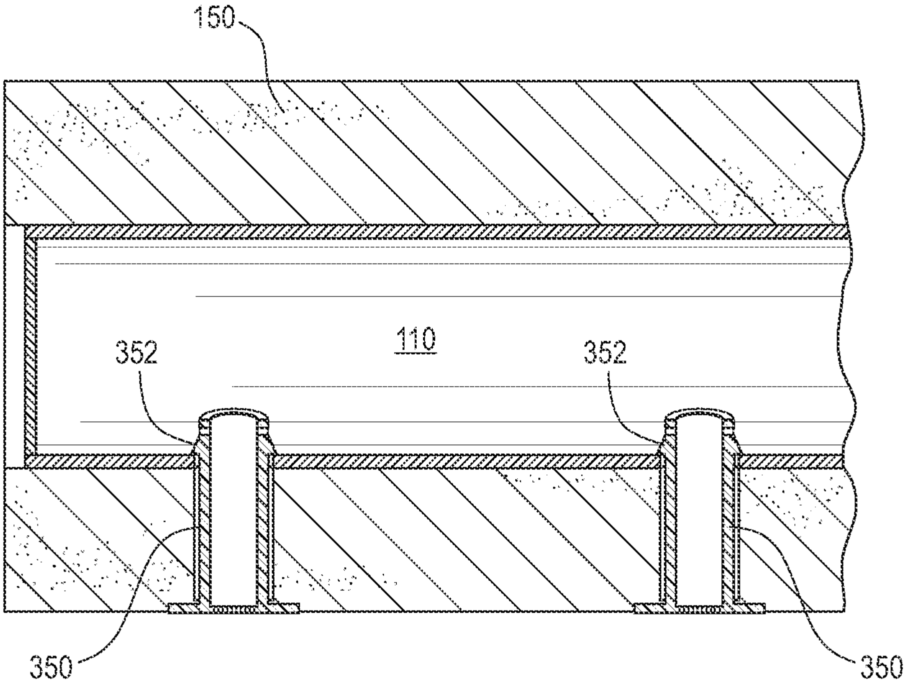

FIGS. 10*a* and 10*b* illustrate a molded plastic inlet assembly 350 with built-in snap locks 352. Forming inlet assembly 350 from molded plastic is a simpler manufacturing process because plate 174, screen 176, and inlet pipe 172 can be formed as a single continuous piece of plastic. The mold shape also includes snap locks 352, so every feature of inlet assembly 350 can be formed in a single molding step.

Snap locks 352 lock inlet assembly 350 in inlet 126 when the inlet assembly is being installed on resonator tube 110. As inlet assembly 350 is pressed into resonator tube 110, snap locks 352 are compressed in by inlet 126, and then expand outward once completely through the inlet. Snap locks 352 are not sloped on the back side, which keeps inlet assembly 350 from being easily pulled back out. Snap locks 352 may be sufficient alone to hold inlet assembly 350, or bolts can be used in conjunction. Using snap locks 352 makes construction easier because the inlet assemblies are snapped in and no additional steps are required. Fiddling with screws or bolts is not necessary.

A molded inlet assembly can also be made without snap locks 352. The molding method still provides many benefits to the manufacturing process even if snap locks are not desired. Moreover, snap locks or another latching mechanism can be added to the metal pipe assemblies by fastening a clipping or locking mechanism to the inlet pipe, possibly in an opening formed through a sidewall of the inlet pipe.

Figure 11A:
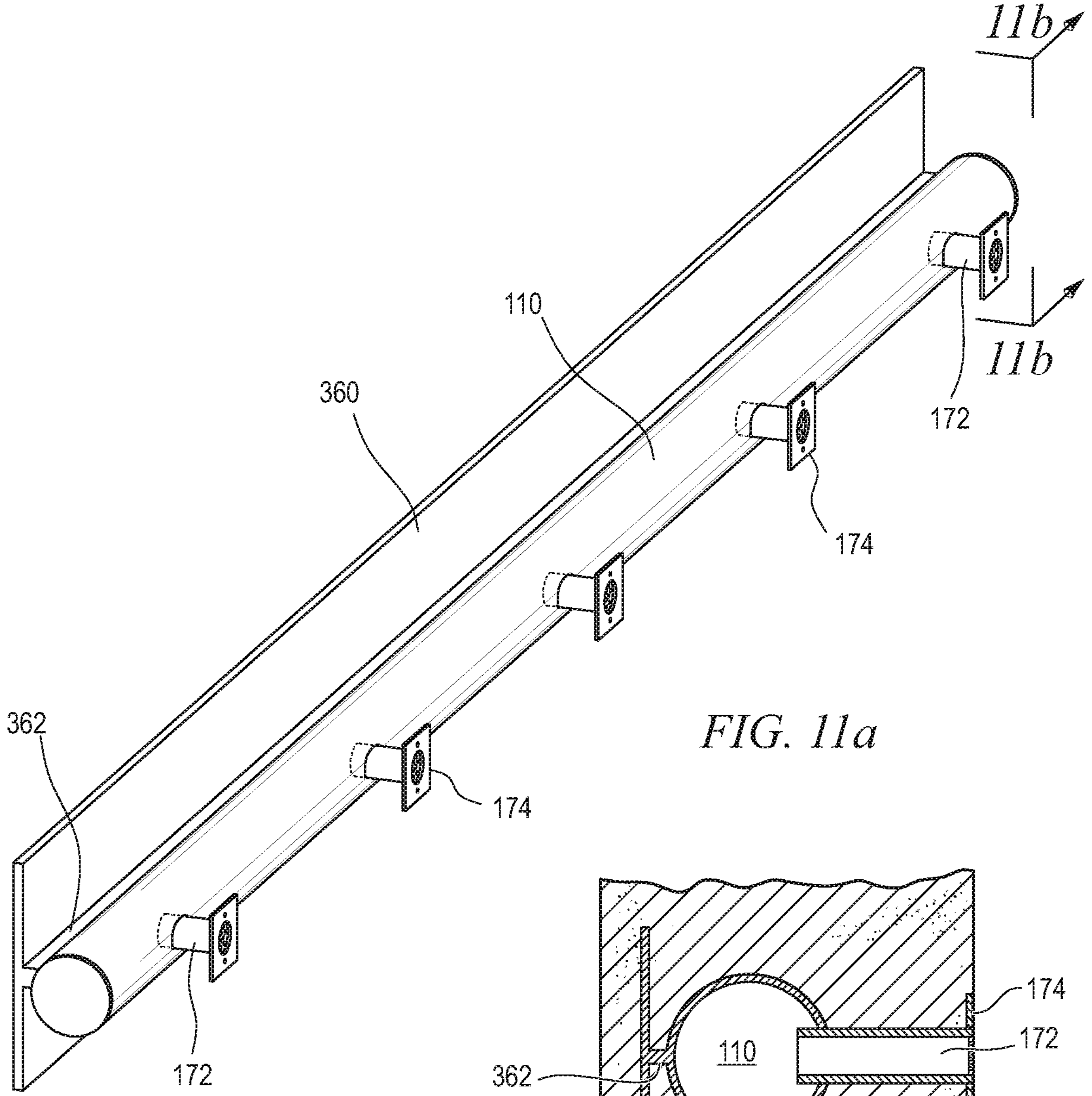
FIGS. 11*a* and 11*b* illustrate resonator tubes with attached backplanes.
Figure 11B:
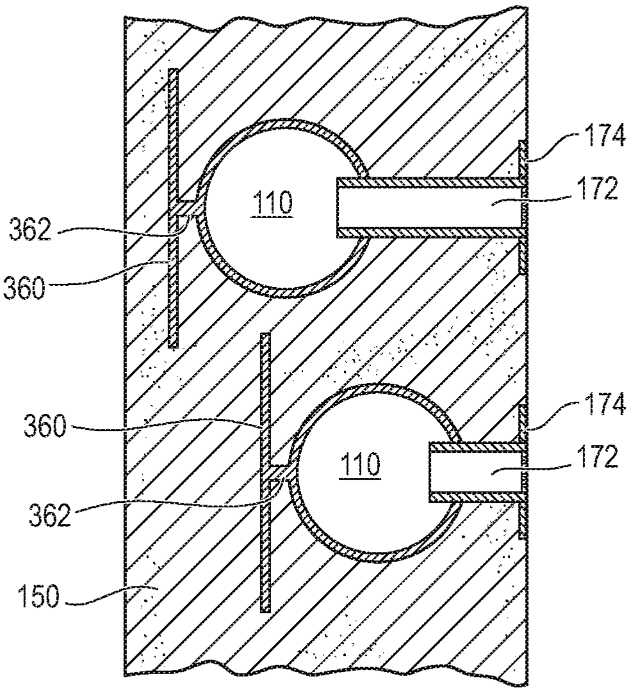

FIGS. 11*a* and 11*b* illustrate a backplane 360 added to resonator tubes 110. Backplane 360 is welded onto resonator tube 110 via an extension 362, extruded together, or otherwise attached to the resonator tubes. Backplanes 360 help by reflecting sound waves that miss going into inlet assemblies 170. Rather than simply going through the EPS material of wall panels 150, with some dampening, and then out the other side of the wall, sound waves are reflected off backplane 360 and back to the noisy side of barrier wall 210. Each resonator tube 110 has a backplane 360 attached thereto, and the backplanes are sized such that the backplanes of adjacent resonator tubes overlap each other. The overlapping of backplanes 360 reduces the likelihood that sound waves traveling through the barrier wall completely miss all backplanes. Backplanes 360 can be added to any other disclosed embodiment.

U.S. Pat. No. 10,400,402, filed Jan. 16, 2019 and granted Sep. 3, 2019, is incorporated herein by reference and provides additional options that can be used in conjunction with the above-described barrier walls. For example, a cable can be used between and around panels in addition to or in conjunction with a resonator tube, or the sound dampening barrier walls can be formed over a traffic barrier.

While one or more embodiments of the present invention have been illustrated in detail, the skilled artisan will appreciate that modifications and adaptations to those embodiments may be made without departing from the scope of the present invention as set forth in the following claims. Those having ordinary skill in the art will recognize that the disclosed features can be used in different combinations than those specifically disclosed when the features are compatible with each other.

What is claimed is:

1. A wall panel, comprising:
a block of expanded polystyrene including a cylindrical opening formed completely through the block;
a resonator tube disposed in the opening of the block, wherein the resonator tube is formed of a cylindrical metal tube;
a sound dampening material disposed within the resonator tube; and
an inlet pipe extending through the base material into the resonator tube.

2. The wall panel of claim 1, further including a vent disposed over the inlet pipe.

3. The wall panel of claim 1, wherein the sound dampening material includes recycled mattress or recycled carpet.

4. The wall panel of claim 1, further including a facade with a conical opening disposed over the inlet pipe.

5. The wall panel of claim 1, wherein the inlet pipe extends at least one inch into the resonator tube.

6. The wall panel of claim 1, further including a snap lock disposed on the inlet pipe.

7. The wall panel of claim 1, wherein the cylindrical metal tube of the resonator tube is capped at two ends to contain the sound dampening material.

8. A method of making a wall panel, comprising:
providing a block of expanded polystyrene;
forming a cylindrical first opening completely through the block;
forming a second opening through a side of the block and into the first opening;
forming a resonator tube by,
providing a cylindrical metal tube,
forming an opening in a side of the cylindrical metal tube, and
filling the cylindrical metal tube with a sound dampening material;
disposing the resonator tube in the first opening of the block with the opening of the cylindrical metal tube aligned to the second opening of the block; and
inserting an inlet pipe through the second opening of the block and the opening of the cylindrical metal tube basc matcrial.

9. The method of claim 8, further including pushing the inlet pipe into the opening of the cylindrical metal tube to engage a snap lock of the inlet pipe with the resonator tube.

10. The method of claim 8, further including disposing a facade comprising a conical opening over the inlet pipe.

11. The method of claim 8, wherein the sound dampening material includes a portion of a mattress or carpet.

12. The method of claim 8, further including stacking two of the wall panels with a second resonator tube disposed between the two wall panels.

13. The method of claim 8, further including compressing the sound dampening material into the cylindrical metal tube using a plunger.

14. The method of claim 8, further including completely filling the cylindrical metal tube with the sound dampening material prior to disposing the resonator tube in the first opening of the block.

15. A method of making a wall panel, comprising:
providing a block of base material;
forming a first opening completely through the base material, wherein the first opening is cylindrical;
forming a resonator tube by,
providing a metal tube, and
filling the metal tube with a sound dampening material; and
disposing the resonator tube in the first opening of the block.

16. The method of claim 15, further including inserting an inlet pipe through a sidewall of the block and into the resonator tube.

17. The method of claim 16, further including disposing a facade comprising a conical opening over the inlet pipe.

18. The method of claim 15, wherein the sound dampening material includes a portion of a mattress or carpet.

19. The method of claim 15, further including stacking two of the wall panels with a second resonator tube disposed between the two wall panels.

20. The method of claim 15, further including compressing the sound dampening material into the cylindrical metal tube using a plunger.

* * * * *